US009004308B2

(12) United States Patent
Spencer et al.

(10) Patent No.: US 9,004,308 B2
(45) Date of Patent: Apr. 14, 2015

(54) TRANSPORT TANK BAFFLE ASSEMBLY

(75) Inventors: Brian Eugene Spencer, Sacramento, CA (US); Zachary B. Spencer, Sacramento, CA (US); Travis Balaski, Calgary (CA)

(73) Assignee: Ferus Inc., Calgary (CA)

( * ) Notice: Subject to any disclaimer, the term of this patent is extended or adjusted under 35 U.S.C. 154(b) by 0 days.

(21) Appl. No.: 13/811,620

(22) PCT Filed: Jul. 29, 2011

(86) PCT No.: PCT/US2011/045946
§ 371 (c)(1),
(2), (4) Date: Jan. 22, 2013

(87) PCT Pub. No.: WO2012/016171
PCT Pub. Date: Feb. 2, 2012

(65) Prior Publication Data
US 2013/0119067 A1 May 16, 2013

Related U.S. Application Data

(60) Provisional application No. 61/369,344, filed on Jul. 30, 2010.

(51) Int. Cl.
B65D 90/52 (2006.01)
B65D 90/02 (2006.01)
B65D 90/04 (2006.01)
B65D 90/32 (2006.01)
F16B 9/02 (2006.01)
B65D 90/54 (2006.01)

(52) U.S. Cl.
CPC .............. *B65D 90/52* (2013.01); *B65D 90/022* (2013.01); *B65D 90/041* (2013.01); *B65D 90/32* (2013.01); *B65D 90/54* (2013.01); *F16B 9/02* (2013.01); *F17C 2260/016* (2013.01)

(58) Field of Classification Search
USPC ........ 220/563, 562, 529, 4.12, 638, 633, 646, 220/650; 137/590, 574, 576
See application file for complete search history.

(56) References Cited

U.S. PATENT DOCUMENTS

| 3,235,003 | A | | 2/1966 | Smith | |
|---|---|---|---|---|---|
| 3,374,916 | A | * | 3/1968 | Herff | 220/564 |
| 4,143,193 | A | * | 3/1979 | Rees | 220/555 |
| 4,517,231 | A | * | 5/1985 | May et al. | 428/36.92 |
| 5,346,092 | A | * | 9/1994 | Gerhard | 220/553 |
| 6,220,287 | B1 | | 4/2001 | Wolf | |
| 2003/0230585 | A1 | | 12/2003 | Hagenbuch | |
| 2007/0096453 | A1 | | 5/2007 | Reber | |
| 2010/0045017 | A1 | | 2/2010 | Rea | |

FOREIGN PATENT DOCUMENTS

| WO | WO 2009/011678 A1 | 1/2009 |
|---|---|---|
| WO | WO 2012/016163 A2 | 2/2012 |
| WO | WO 2012/016164 A1 | 2/2012 |

* cited by examiner

Primary Examiner — Andrew Perreault
(74) Attorney, Agent, or Firm — Ferus Inc.

(57) ABSTRACT

A lined transport tank for mounting to a truck is provided. The tank has a lined tank body. The tank body has an inner surface. A baffle is removably connected to the inner surface of the tank body. A retaining system is removably connecting the baffle to the inner surface of the tank body. The retaining system has a pair of elongated members fixedly connected to the inner surface of the tank body. The pair of elongated members is restraining movement of the baffle in a first direction. A retainer is connected to the pair of elongated members. The retainer is restraining movement of the baffle in a second direction. The second direction is different from the first direction. A retaining system for removably connecting an element to a surface is also provided.

36 Claims, 17 Drawing Sheets

TRANSPORT TANK BAFFLE ASSEMBLY

CROSS-REFERENCE

The present application claims priority to U.S. Provisional Patent Application Ser. No. 61/369,344, entitled 'Transport Tank Baffle Assembly', filed Jul. 30, 2010, the entirety of which is incorporated herein by reference.

TECHNICAL FIELD

The present invention relates to baffle assemblies for transport tanks for trucks.

BACKGROUND

Many industries use trucks for the transportation of their goods. To transport a liquid, a truck is provided with a transport tank mounted to a frame of the truck or to a trailer of the truck. When the liquid is to be transported under pressure, the transport tank needs to be constructed to withstand this pressure. One example of such a liquid is a liquefied petroleum gas, such as propane. Typically, in order to withstand internal pressures, transport tanks are made of metal, such as carbon or stainless steel, and have a cylindrical central section and two generally curved ends. Although metal transport tanks such as the one described above are suitable for the transport of pressurized liquids they have some drawbacks.

In most jurisdictions, the total truck weight (truck plus payload) or total trailer weight (trailer plus payload) is not allowed to exceed a predetermined maximum weight. As a metal transport tank is heavy, the maximum weight of the payload that can be transported is less than could otherwise be transported if the transport tank was lighter. Also, a metal transport tank tends to corrode over time which requires maintenance, repair, and in some cases replacement of the tank.

One solution to the above-mentioned drawbacks of metal transport tanks consist in making the transport tank out of composite material. For tanks of the same volume, composite transport tanks are lighter than metal transport tanks. As a result, by using a composite transport tank, the maximum weight of the payload that can be transported can be increased. Also, composite materials are typically less susceptible to corrosion than metals.

When transporting liquids, tanks can be subjected to sloshing. Sloshing is the motion of liquid against the tank's walls, due to inertia forces. Sloshing appears, for example, when the truck accelerates or brakes. When a liquid sloshes, great forces are generated at the tank's wall on which the liquid is projected, which may render the truck unstable and/or difficult to control.

One way to decrease sloshing is to dispose within the tank one or more baffles. The baffles break the motion of the liquid, which in turn decreases the forces generated by sloshing. Some baffles are fixed to the tank. When fixed to the tank, the baffles have to be securely fixed to the tank wall with sufficient strength to sustain the forces generated by the sloshing. When the tank is made of metal, it is usual to weld the baffles or the baffle connectors to the tank. However, when the tank is not made of metal, welding, in the same manner as for metal tanks, can lead to zones of stresses at the weld which ultimately may break off the connection between the baffle and the tank when the baffles are subjected to the sloshing forces. In addition, it is desirable that the baffles be removable to allow inspection and cleaning of the tank.

Therefore, there is a need for a transport tank with a baffle, removably connected to the tank, where the divider or baffle would in addition be adapted for use in composite tanks.

SUMMARY

It is an object of the present invention to ameliorate at least some of the inconveniences present in the prior art.

In one aspect, a lined transport tank for mounting to a truck is provided. The tank comprises a lined tank body having an inner surface. A baffle is removably connected to the inner surface of the tank body. A retaining system is removably connecting the baffle to the inner surface of the tank body. The retaining system comprises a pair of elongated members fixedly connected to the inner surface of the tank body. The pair of elongated members is restraining movement of the baffle in a first direction. A retainer is connected to the pair of elongated members. The retainer is restraining movement of the baffle in a second direction. The second direction is different from the first direction.

In a further aspect, the tank body has a cylindrical section. The first direction is a longitudinal direction with respect to the cylindrical section. The second direction is a circumferential direction with respect to the cylindrical section.

In an additional aspect, the pair of elongated members is generally perpendicular to a longitudinal centerline of the tank body.

In a further aspect, when the tank is mounted onto the truck, the pair of elongated members is disposed vertically above a lowest point of the inner surface of the tank body.

In an additional aspect, the retainer is fixedly connected to the pair of elongated members.

In a further aspect, the retainer includes a pair of tabs. The tabs connect the elongated members together. The baffle is disposed at least in part between the tabs.

In an additional aspect, the baffle has a first end and a second end. The retaining system is a first retaining system. The first retaining system removably connects the first end of the baffle to the inner surface of the tank body. A second retaining system is removably connecting the second end of the baffle to the inner surface of the tank body.

In a further aspect, the retaining system further comprises a baffle connector having a first end and a second end. The first end of the baffle connector is removably connected to the baffle. The second end of the baffle connector is disposed at least in part between the pair of elongated members. The pair of elongated members restrains movement of the baffle connector in the first direction. The retainer restrains movement of the baffle connector in the second direction.

In an additional aspect, the second end of the baffle connector has outwardly extending tabs. The tabs are disposed radially between the retainer and the tank body.

In a further aspect, the retainer abuts the baffle connector for restraining movement of the baffle connector from moving in the second direction.

In an additional aspect, the first end of the baffle connector is fastened to the baffle.

In a further aspect, the baffle connector is spaced from the inner surface of the tank body.

In an additional aspect, a wear element is disposed between the second end of the baffle connector and the inner surface of the tank body. The second end of the baffle connector is abutting the wear element.

In a further aspect, the baffle comprises a first sub-baffle and a second sub-baffle. The first and second sub-baffles are removably connected to the baffle connector.

In an additional aspect, the baffle is received at least in part between the pair of elongated members.

In a further aspect, the baffle has outwardly extending tabs, and the tabs are disposed radially between the retainer and the tank body.

In another aspect, a retaining system for removably connecting an element to a surface is provided. The retaining system comprises a connector having a first end and a second end. The first end is adapted to be removably connected to the element. A pair of elongated members is adapted to be fixedly connected to the surface. The second end of the connector is disposed at least in part between the pair of elongated members. The pair of elongated members is restraining movement of the connector in a first direction. A retainer is connected to the pair of elongated members. The retainer is restraining movement of the connector in a second direction. The second direction is different from the first direction.

For purposes of this application, the adjective "composite", such as in "composite tank body", indicates that the associated element is made at least in part of composite materials. Examples of composite materials include, but are not limited to, carbon fibers with epoxy resin and aramid fibers with acrylate-based resin. The term "baffle" refers to an obstruction for deflecting the flow of liquid.

Embodiments of the present invention each have at least one of the above-mentioned aspects, but do not necessarily have all of them.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION

Figure 1:
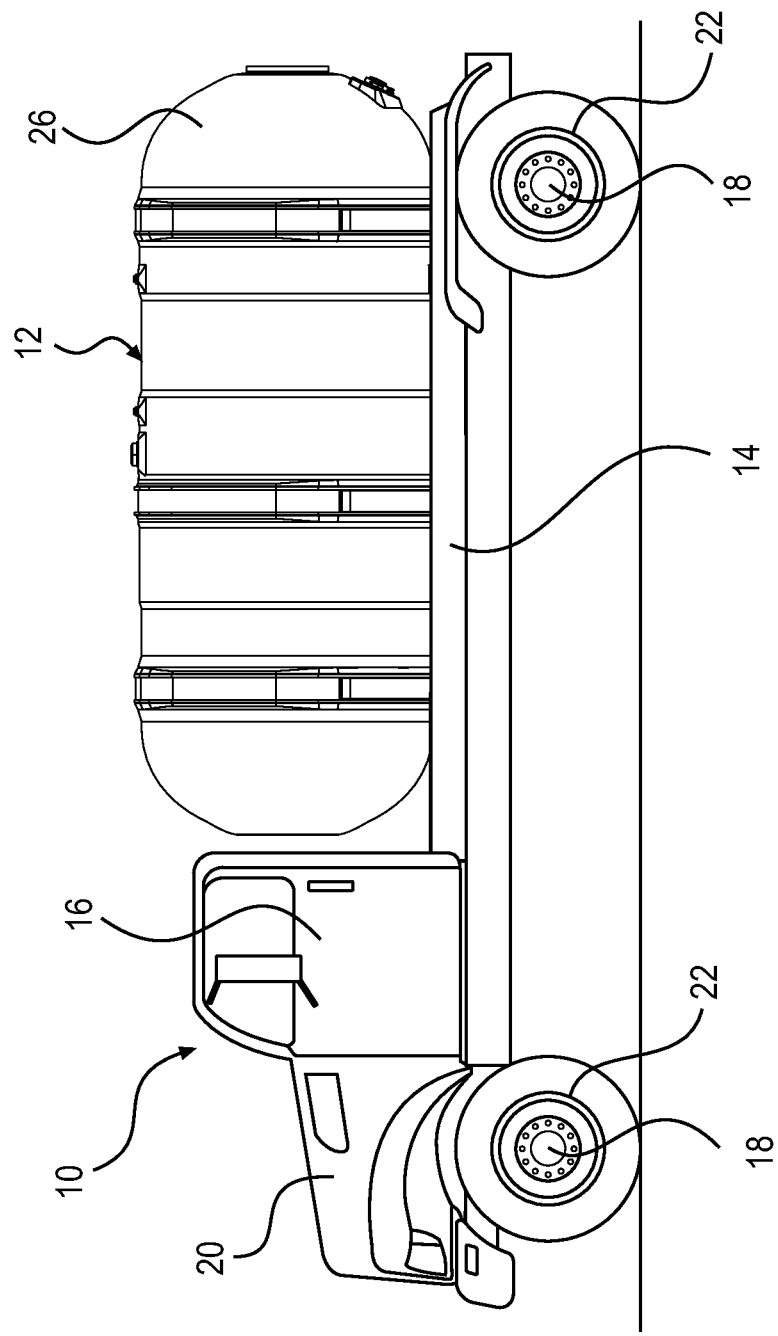
FIG. 1 is a left side elevation view of a truck having a transport tank.

A truck 10 having a transport tank 12 in accordance with aspects of the present invention will be described with respect to FIG. 1. The truck 10 has a frame 14 to which a cabin 16, two axles 18, an engine (not shown), and the tank 12 are connected. The engine is covered by a hood 20. The engine drives at least one of the two axles 18. A plurality of wheels 22 are mounted to the axles 18. It is contemplated that the truck 10 could have more than two axles 18.

Figure 2:
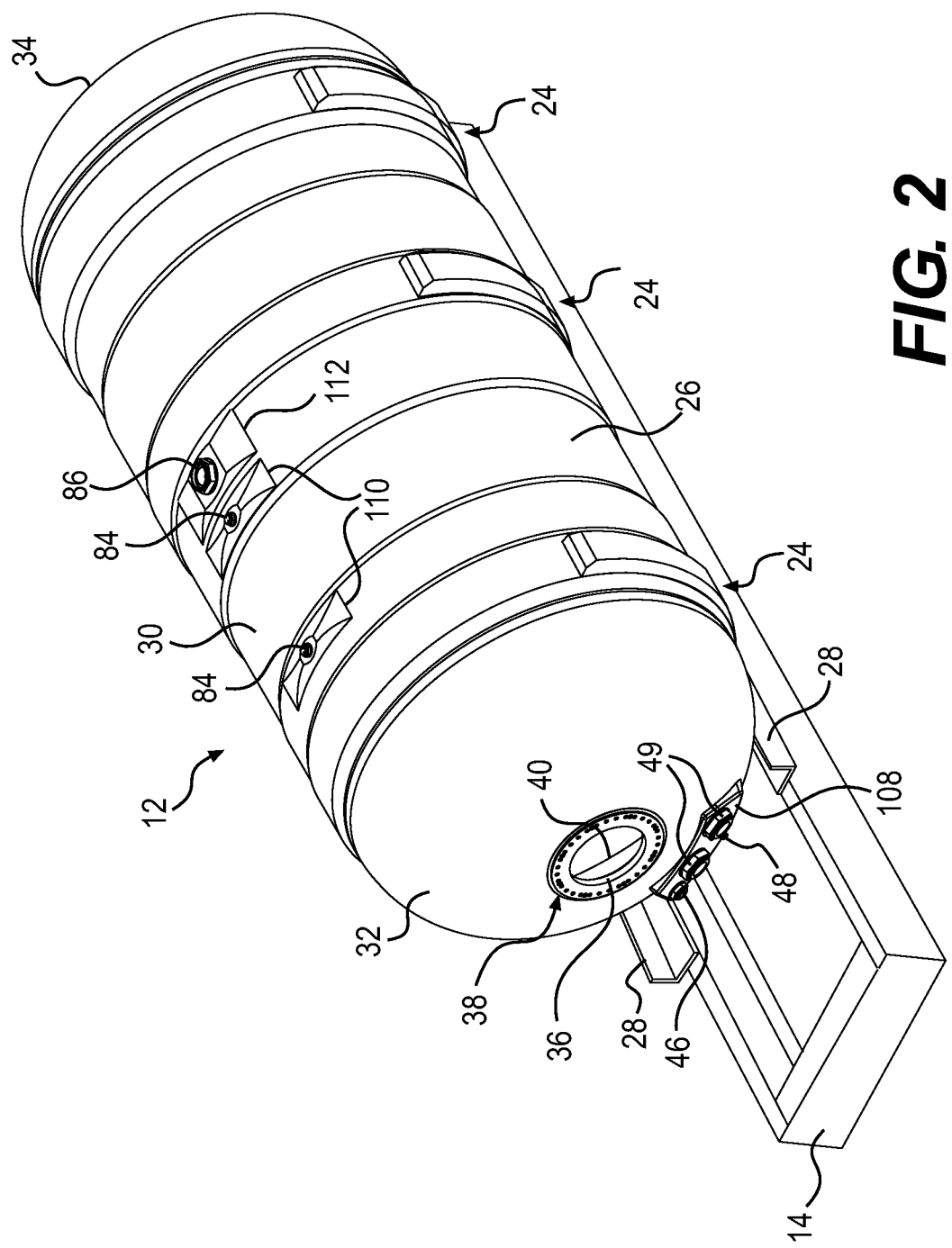
FIG. 2 is a perspective view taken from a rear, right side of the transport tank and a portion of a frame of the truck of FIG. 1.

As seen in FIG. 2, the tank 12 is connected to the frame 14 of the truck 10 via three cradle assemblies 24. It is contemplated that more or less than three cradle assemblies 24 could be used. The cradle assemblies 24 are bonded to an outer side of a body 26 of the tank 12. Two L-bars 28 are connected to the cradle assemblies 24 and are fastened to the frame 14. It is contemplated that the cradle assemblies 24 could alternatively be fastened or otherwise connected to the tank 12. It is also contemplated that the cradle assemblies 24 could be connected to the frame 14 by other means, such as by welding the cradle assemblies 24 directly to the frame 14.

It is contemplated that the truck 10 could have a flatbed mounted to the frame 14. In such an embodiment, the tank 12 would be mounted to the flatbed. It is also contemplated that the tank 12 could be mounted to a truck of a different type than the truck 10 shown in FIG. 1. For example, the truck could be a tractor-trailer consisting of a tractor and of a full trailer or semitrailer hooked to the tractor. In such an embodiment, the tank would be mounted to the full trailer or semitrailer.

Figure 3:
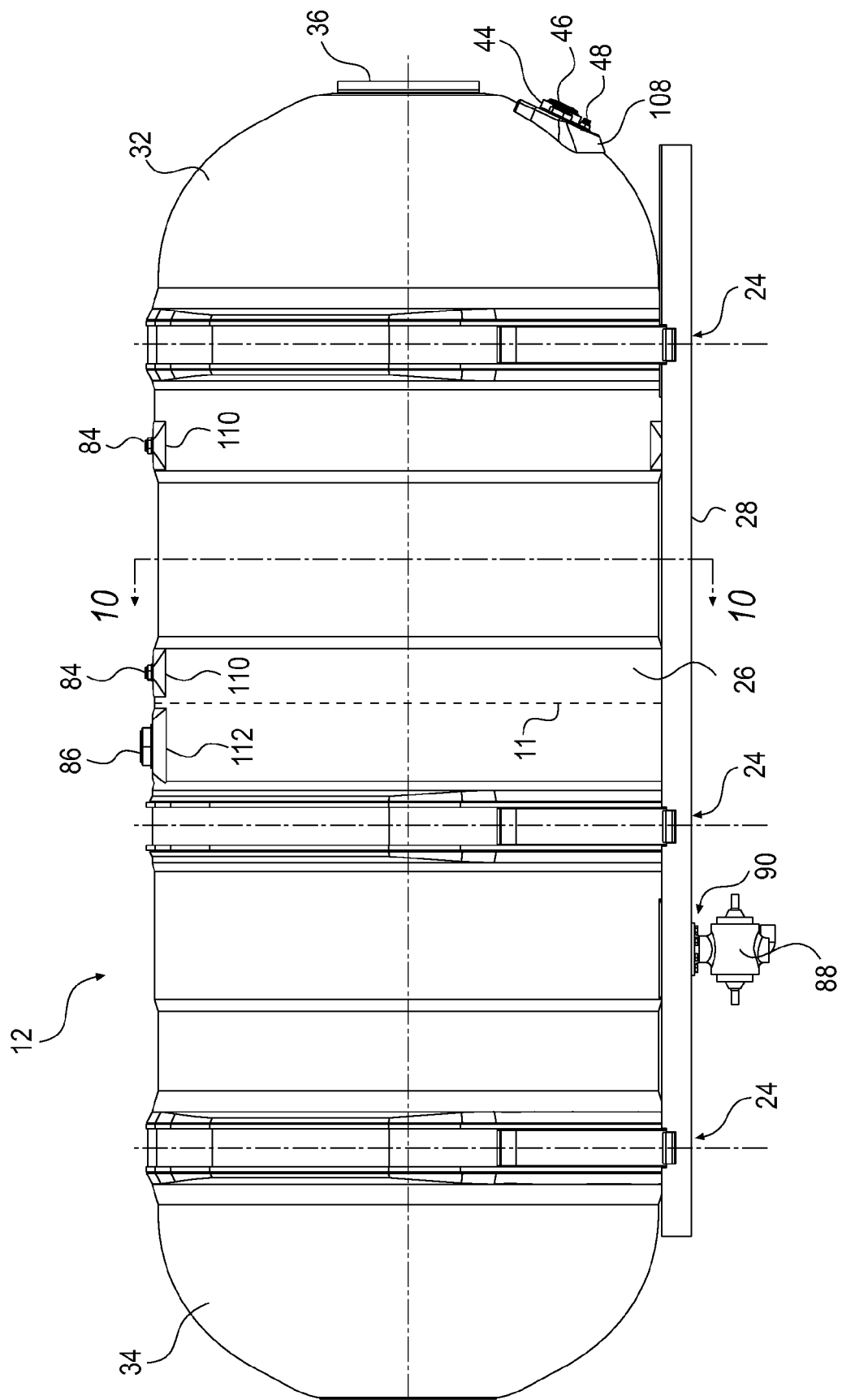
FIG. 3 is a left side elevation view of the transport tank of FIG. 1.
Figure 4:
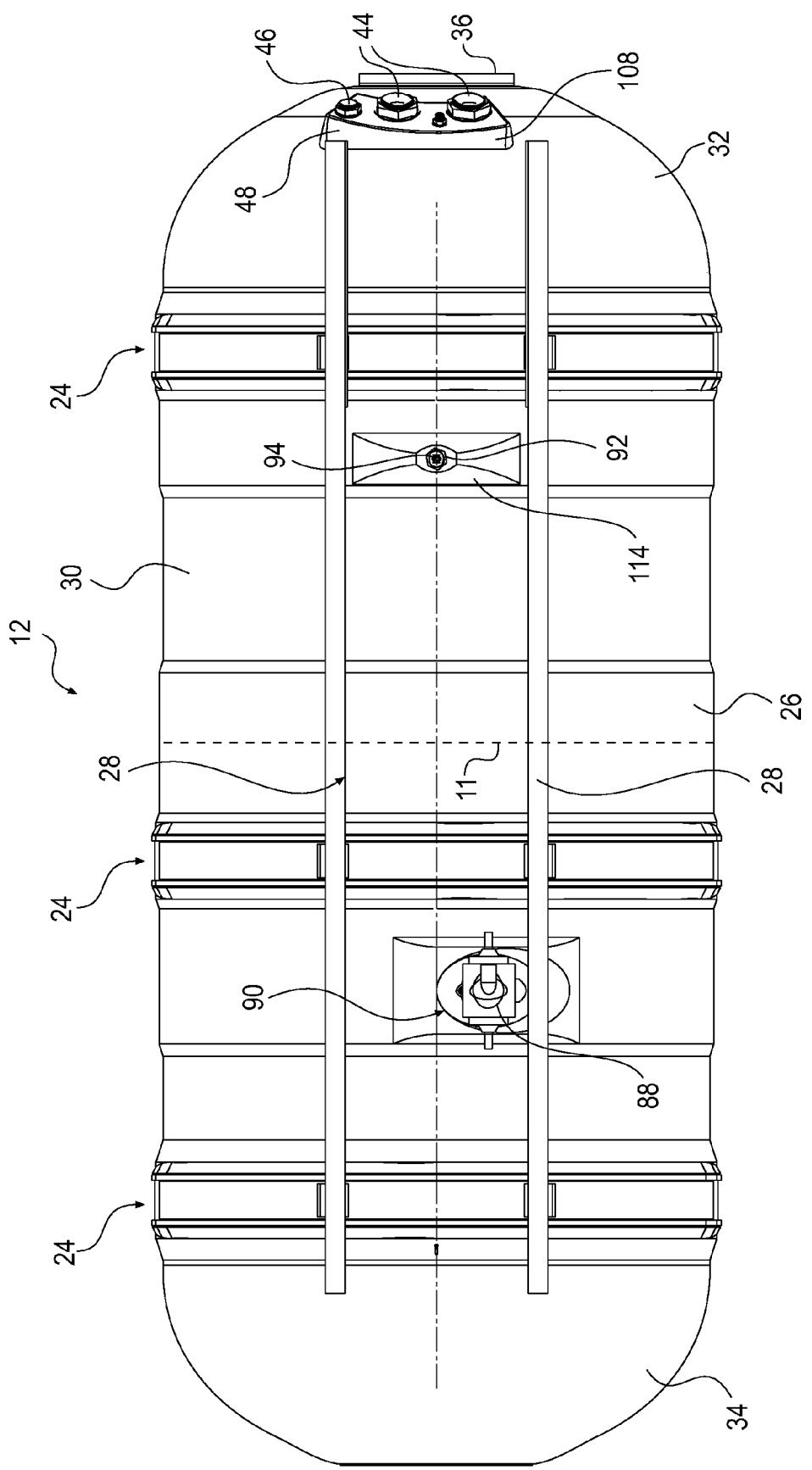
FIG. 4 is a bottom plan view of the transport tank of FIG. 3.
Figure 5:
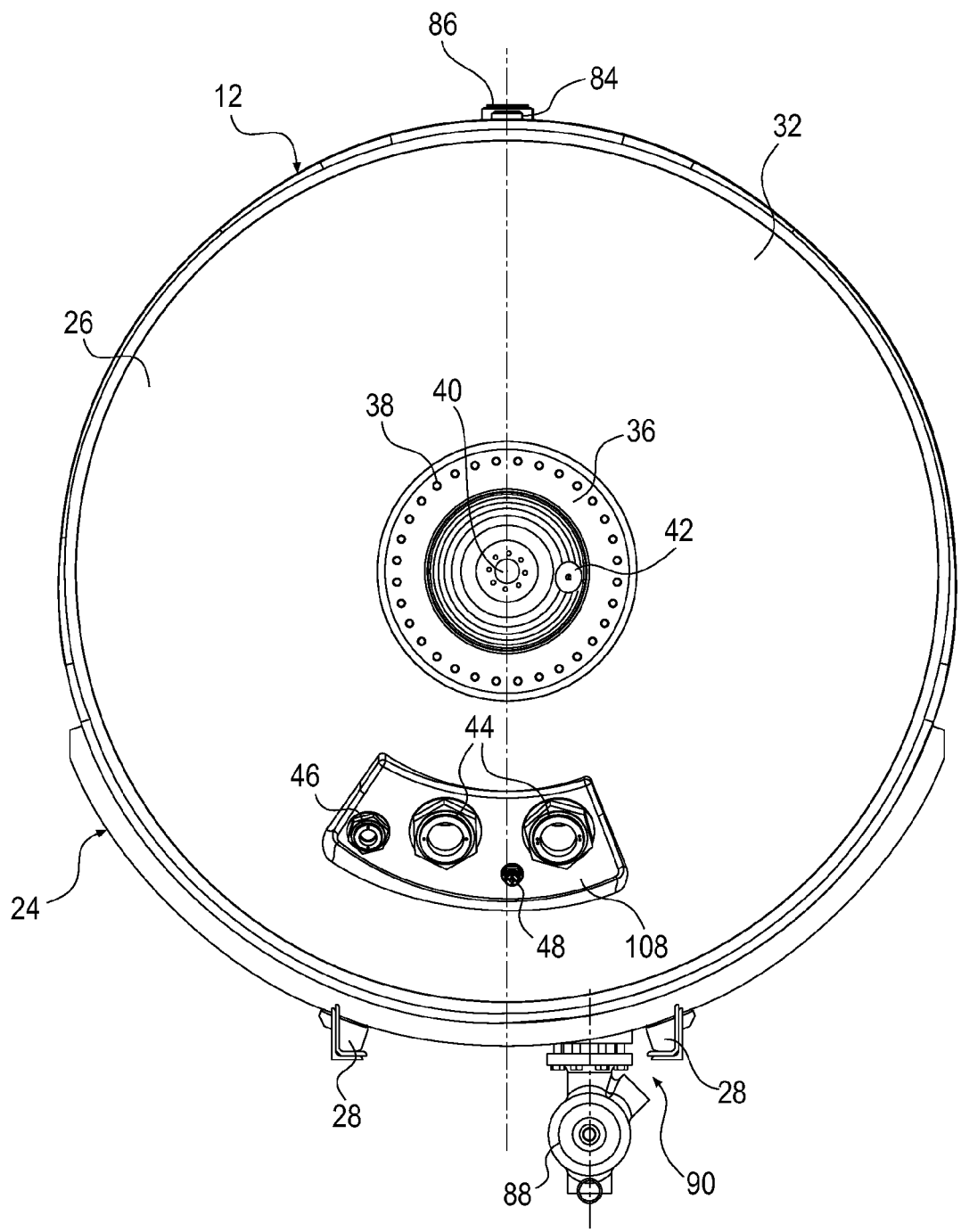
FIG. 5 is a rear elevation view of the transport tank of FIG. 3.

Turning now to FIGS. 2 to 5, the tank 12 will be described in more detail. The tank body 26 has a cylindrical central section 30 closed by two generally curved ends 32, 34. It is contemplated that the tank body 26 could be shaped so as to have a non-circular lateral cross-section, such as an ellipsoidal lateral cross-section. A man-way is formed in the rear end 32 of the tank body 26 to permit the passage of a person inside the tank 12 for maintenance, cleaning, and assembly of components of the tank 12. The man-way is closed by a cover 36 which is fastened by a plurality of threaded fasteners 38. As best seen in FIG. 5, a float gauge 40 is inserted in an aperture in the center of the cover 36. The float gauge 40 provides an indication of the level of liquid in the tank 12. A temperature gauge 42 is inserted in another aperture in the cover 36. The temperature gauge 42 provides an indication of the temperature of the liquid in the tank 12.

A number of fittings 44, 46 and 48 are provided in the rear end 32 of the tank body 26 below the man-way cover 36. The fittings 44, 46 and 48 are made of carbon steel. However, it is contemplated that the fittings 44, 46 and 48 could be made of other types of metal or of plastic, such as fiber reinforced plastic.

Figure 8:
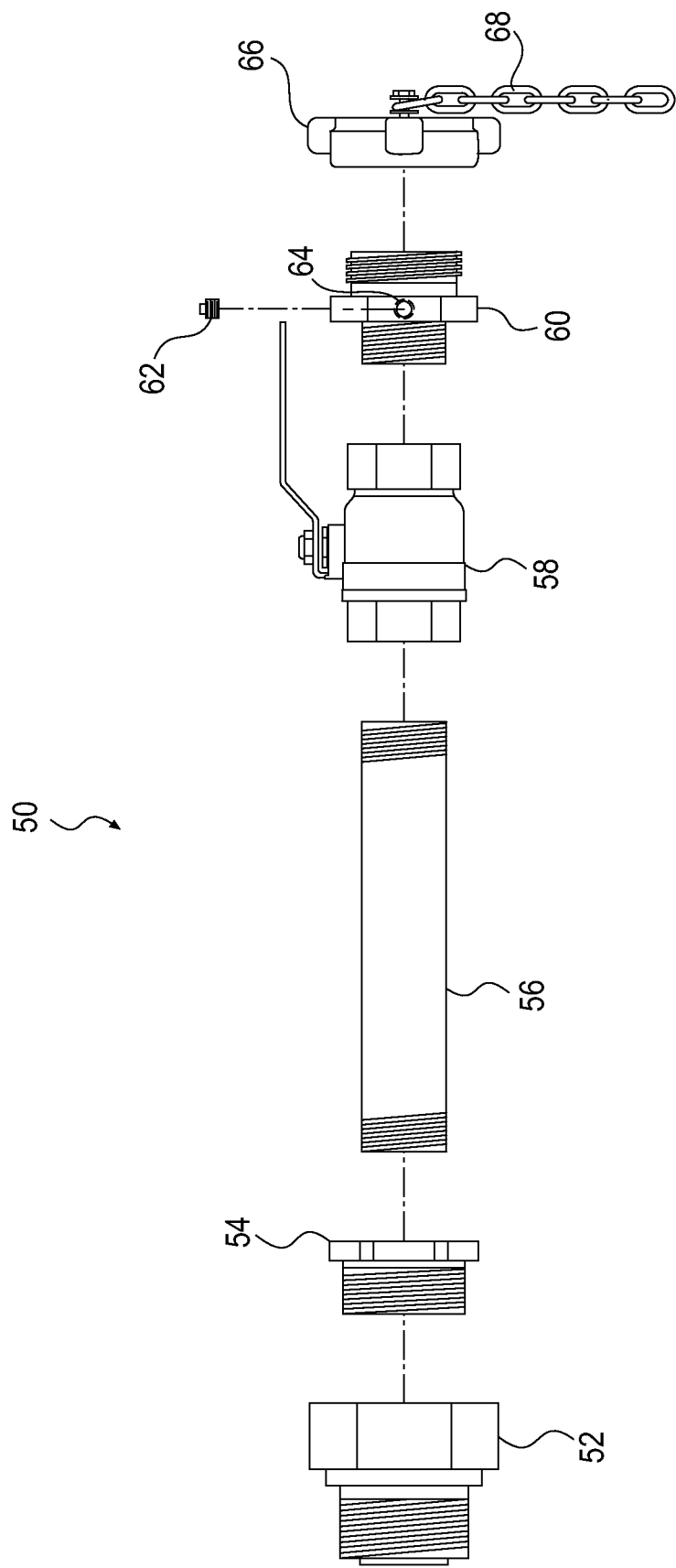
FIG. 8 is an exploded view of a pipe and valve assembly for attachment to a spray fill fitting of the transport tank of FIG. 3.

The two fittings 44 are referred to as spray fill fittings 44. A pipe and valve assembly 50, shown in FIG. 8, is connected to the outer end of the fittings 44. As shown in FIG. 8, the assembly 50 has a back pressure check valve 52. The valve 52 is threaded into the spray fill fitting 44 and prevents vapor from flowing out of the tank 12. A bushing 54 is threaded into the valve 52. A pipe 56 has one end threaded in the bushing 54 and another end threaded in an end of a manually operated valve 58. An adaptor 60 is threaded in the other end of valve 58. A plug 62 fits into a hole 64 in the side of the adaptor 60. The hole 64 gives an operator of the truck 10 the ability to install a vent valve and release pressure between the valve 58 and a removable cap 66 before connecting a fill hose. The removable cap 66 is threaded on the end of the adaptor 60. The cap 66 is connected to the tank 12 or truck 10 by a chain 68 to prevent the cap 66 from being misplaced when it is removed from the end of the adaptor 60. In the interior of the tank 12, pipes (not shown) are connected to the spray fill fittings 44. The pipes are suspended from the top of the tank body 26, as described in greater detail below, such that the outlets of the pipes are higher than the fittings 44. To fill the tank 12, the cap 66 is removed from the adaptor 60. A fill hose from a storage tank holding the liquid to be put in the tank 12 is connected to the adaptor 60. The valve 58 is then opened and a pump turned on to pump liquid through the assembly 50 into the pipe and is finally sprayed inside the tank 12 (hence the name spray fill fitting for the fitting 44). Once the desired amount of liquid is in the tank 12, the pump is turned off, the valve 58 is closed and the cap 66 is threaded back on the adaptor 60. The above is simply a general description of the major steps necessary to fill the tank 12. It should be understood that additional steps could be necessary. By providing two spray fill fittings 44, it is possible to fill the tank 12 faster.

Figure 9:
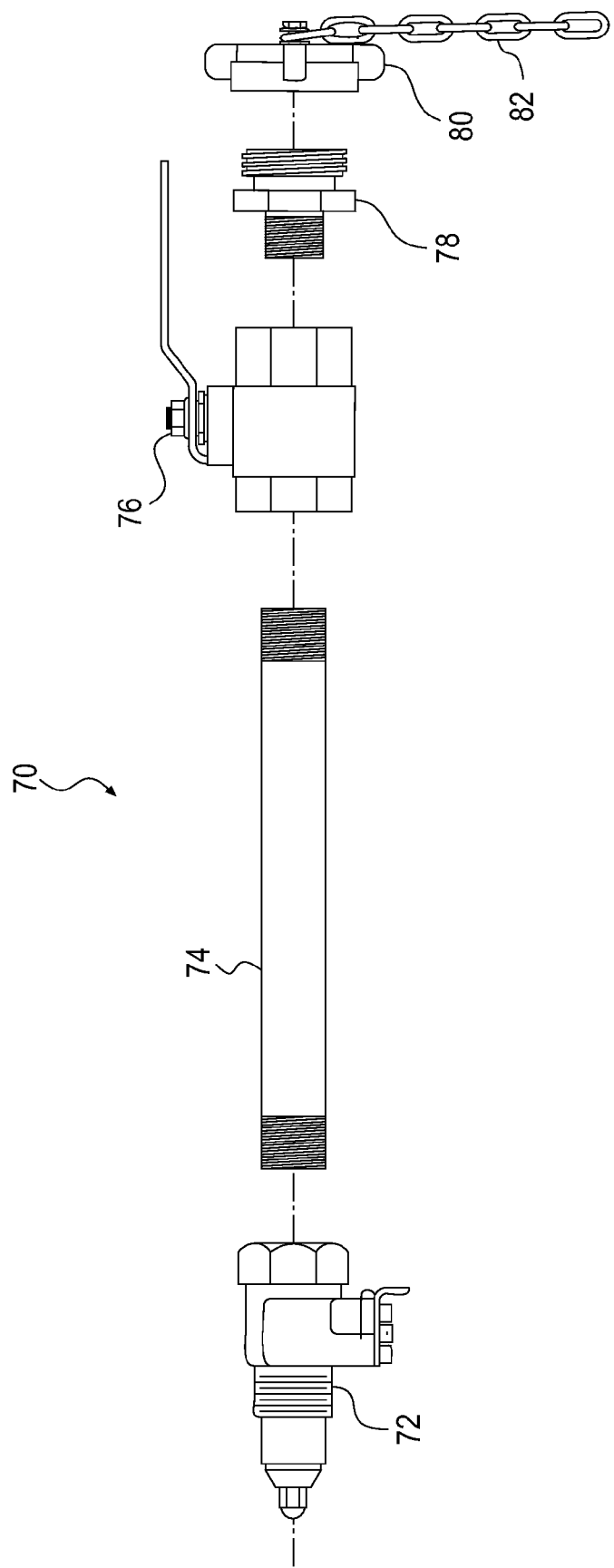
FIG. 9 is an exploded view of a pipe and valve assembly for attachment to a vapor fitting of the transport tank of FIG. 3.

The fitting 46 is referred to as a vapor fitting 46. A pipe and valve assembly 70, shown in FIG. 9, is connected to the outer end of the fittings 46. As shown in FIG. 9, the assembly 70 has a valve 72. The valve 72 is threaded into the vapor fitting 46 and prevents vapor from accidentally releasing from the tank 12. A pipe 74 has one end threaded in the valve 72 and another end threaded in an end of a manually operated valve 76. An adaptor 78 is threaded in the other end of valve 76. A removable cap 80 is threaded on the end of the adaptor 78. The cap 80 is connected to the tank 12 or truck 10 by a chain 82 to prevent the cap 80 from being misplaced when it is removed from the end of the adaptor 78. In the interior of the tank 12, a pipe (not shown) is connected to the vapor fitting 46. By removing the cap 80 from the adaptor 78 and by opening the valve 76, the operator can release vapor pressure from inside the tank 12.

The fitting 48 receives a pressure gauge (not shown) connected to a tube (not shown) disposed inside the tank 12 and a manual valve (not shown). The tube has an opened end disposed inside the tank 12 at a level corresponding to 85% of the volume of tank body 26. When the level of liquid inside the tank body 26 reaches the end of the tube, the tank body 26 is 85% full. The operator can see that this volume is reached by opening the manual valve and determining if liquid is present in the valve. It is contemplated that this level may vary depending on local regulations.

A number of fittings 84 and 86 are provided in the top of the tank body 26 along the longitudinal centerline of the tank 12. It is contemplated that the fittings 84 and 86 could be offset from the centerline of the tank 12. The fittings 84 and 86 are made of carbon steel. However, it is contemplated that the fittings 84 and 86 could be made of other types of metal or of plastic, such as fiber reinforced plastic.

The two fittings 84 each hold a hanger (not shown) which extends inside the tank body 26. The hangers hold the various pipes and tubes described above inside the tank body 26.

The fitting 86 receives a pressure relief valve (not shown). The pressure relief valve opens when a predetermined pressure is reached inside the tank body 26 thus preventing the tank body 26 from becoming over pressurized.

As seen in FIGS. 3 to 5, a pump 88 is mounted to a bottom of the tank body 26. The pump 88 is used to pump liquid out of the tank 12. The pump 88 is laterally offset from the longitudinal centerline of the tank 12 in order to facilitate operation of the pump 88 and so as not to interfere with other components of the truck 10 such as the frame 14. However, it is contemplated that the pump 88 could be mounted along the longitudinal centerline or at any other position on the tank body 26 depending on the structure of the truck 10 on which the tank 12 is mounted. The pump 88 is mounted to the tank body 26 via a pump mounting assembly 90.

Since the pump 88 is offset from the longitudinal centerline of the tank 12, the inlet to the pump 88 provided in the pump mounting assembly 90 is located higher than the lowest portion of the tank body 26. As such, the pump 88 cannot pump all of the liquid out of the tank body 26. To allow removal of all of the liquid from the tank body 26, a drain fitting 92 (FIG. 4) is provided in the bottom of the tank body 26 along the longitudinal centerline of the tank 12. The drain fitting 92 is made of carbon steel. However, it is contemplated that the drain fitting 92 could be made of other types of metal or of plastic, such as fiber reinforced plastic. The drain fitting 92 is closed by a threaded plug 94 (FIG. 4). By removing the threaded plug 94, the content of the tank body 26 can be drained by the drain fitting 92.

Figure 6:
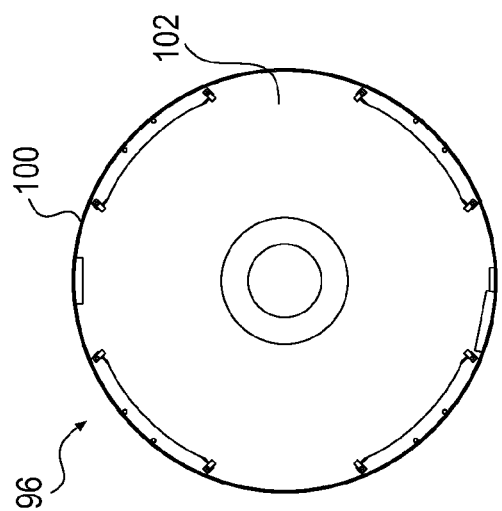
FIG. 6 is a rear elevation view of a liner of the transport tank of FIG. 3.

The structure and construction of the tank 12 will now be described in more detail. The tank body 26 is made of a liner 96, shown in FIGS. 6 and 7, disposed inside a composite outer shell 98, shown in FIG. 10, thus forming a composite tank body 26.

Figure 7:
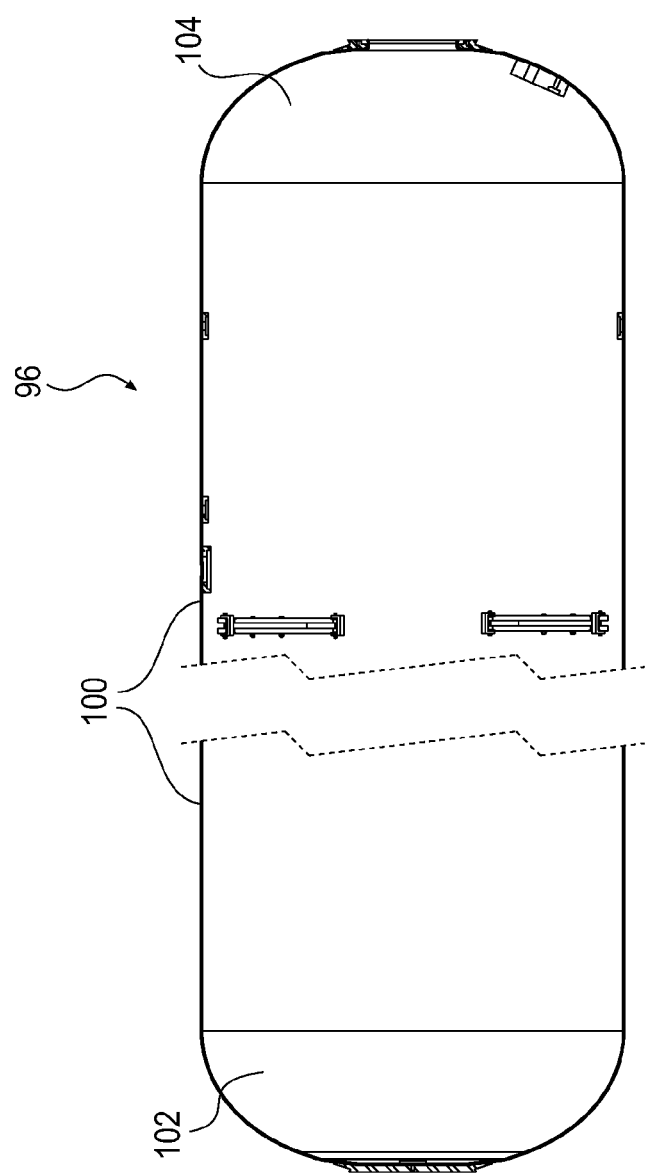
FIG. 7 is a right side elevation view of the liner of FIG. 6.

As shown in FIG. 7, the liner 96 has a cylindrical central section 100 and two generally curved ends 102, 104. The liner 96 is made of high density polyethylene (HDPE) and is formed by a rotational molding process. The liner 96 is non-permeable. It is contemplated that the liner 96 could be made of another type of polymer. It is also contemplated that the liner 96 could be made of metal or other material. It is also contemplated that the liner 96 could be made by another type of process, such as blow-molding. It is also contemplated that the liner 96 could be permeable. A man-way fitting (not shown) is bonded around an aperture in the end of the generally curved end 102 of the liner 96. In the finished tank 12, the man-way cover 36 is bolted onto the man-way fitting.

The outer shell 98 is then formed by winding carbon fibers impregnated with epoxy resin around the liner 96. The carbon fibers are wound helically (i.e. at an acute angle to the longitudinal central axis of the liner 96) and circumferentially (i.e. generally perpendicularly to the longitudinal central axis of the liner 96) around the liner 96 so as to cover the liner 96. The angles at which the carbon fiber helical and circumferential windings are applied and the number of layers to be applied depend on the size of the tank body 26, the amount of internal pressure that the tank body 26 needs to withstand, and the specific material characteristics of the carbon fiber and resin being used. It is contemplated that other types of composite materials could be used, such as aramid fibers impregnated with resin. It is contemplated that the fibers could be wound dry and that resin could be applied to the fibers as they are being wound or after a certain number of windings have been wound around the liner 96. Some of the windings cover portions of the man-way fitting and hold it in place.

A number of outer bosses 108, 110, 112 and 114 are mounted on the outer side of the tank body 26 in the areas where the fittings 44, 46, 48, 84, 86, and 92 will be located.

The outer bosses 108, 110, 112 and 114 are formed by laying additional layers of carbon fibers impregnated with epoxy resin to these areas. The number of layers and the angles at which the fibers are laid for each outer boss 108, 110, 112 and 114 depend on the dimensions of the apertures to insert each of the fitting 44, 46, 48, 84, 86, and 92 and the strength characteristics of the tank body 26 in the area where each of the fittings 44, 46, 48, 84, 86, and 92 will be located. It is contemplated that the outer bosses 108, 110, 112 and 114 could also be formed by polymeric, metallic, or composite cores covered by carbon fibers and resin or other composite material. It is contemplated that the outer bosses 108, 110, 112 and 114 could also be formed by interspersing layers of carbon fiber and resin between windings forming the outer shell 98 of the tank body 26.

Due to the relative proximity of the apertures for the fittings 44, 46 and 48, these apertures are provided with a common outer boss 108. However, it is contemplated that individual outer bosses could be provided for each one of the fittings 44, 46 and 48. The apertures for the fittings 84, 86 and 92 are each provided with their own outer boss 110, 112 and 114, respectively.

It is contemplated that the aperture provided for the pump mounting assembly 90 could also be provided with an outer boss formed by laying additional layers of carbon fibers impregnated with epoxy resin to the region of the aperture.

Once the outer bosses 108, 110, 112, and 114 have been laid on the tank body 26, the tank body 26 and the outer bosses 108, 110, 112, and 114 are cured. Once cured, the apertures for the fittings 44, 46, 48, 84, 86, and 92 are cut through the outer bosses 108, 110, 112, and 114, the outer shell 98 and the liner 96. The aperture for the pump mounting assembly 90 is also cut.

Once the apertures for the fittings 44, 46, 48, 84, 86, and 92 and for the pump mounting assembly 90 are cut, the fittings 44, 46, 48, 84, 86, and 92 and the pump mounting assembly 90 are mounted to the tank body 26.

Figure 10:
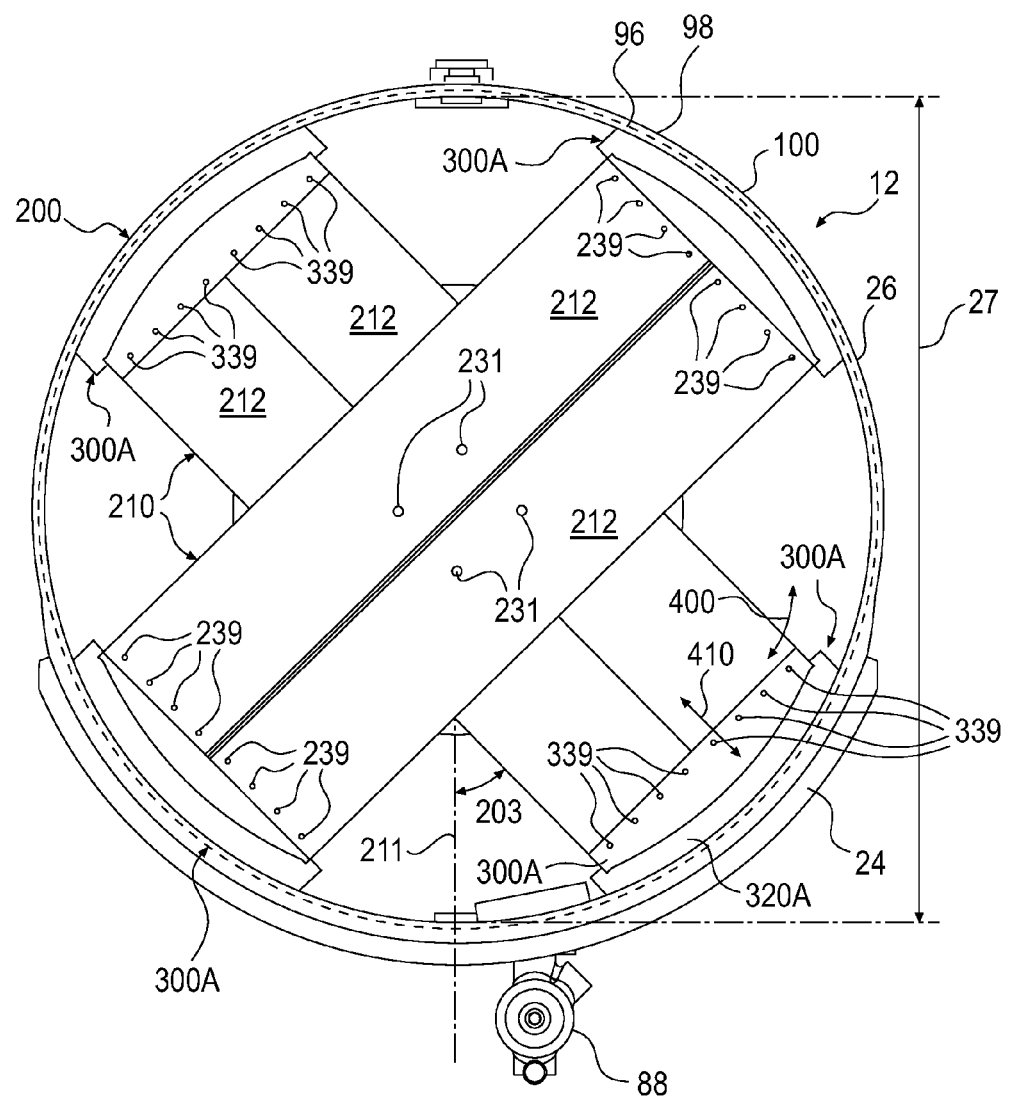
FIG. 10 is a cross-sectional view of the tank taken along line 10-10 of FIG. 3, revealing a baffle assembly according to a first embodiment.

Turning now to FIG. 10, a baffle assembly 200 of the tank 12 will be described. The baffle assembly 200 is a removable structure used for decreasing liquid sloshing in the tank 12. As will be described below, the baffle assembly 200 is adapted to be inserted though the man-way and assembled inside the tank body 26 by an operator. The baffle assembly 200 is secured to the tank body 26 by four retaining systems 300A. The retaining systems 300A will be described in detail below. It is contemplated that the tank 12 could have more than one baffle assembly 200. Although the baffle assembly 200 and retaining systems 300A for the baffle assembly are described herein for the tank 12 having a liner 96, it is contemplated that some aspects could be used on a tank having no liner.

The baffle assembly 200 includes two baffles 210 crossing each other at their mid-length. The baffle assembly 200 forms a generally X-shape. The baffle assembly 200 is disposed inside the tank body 26 at about mid-length of the cylindrical central section 100 of the liner 96. The baffle assembly 200 is disposed vertically on a vertical cross-sectional plane 11 (shown in FIGS. 3 and 4). The baffles 210 are disposed so as to leave a clearance at the bottom of the tank body 26 for liquid to drain toward the pump 88 and drain fitting 92. It is contemplated that only one or more than two baffles 210 could be included in the baffle assembly 200. It is also contemplated that the baffles 210 could be disposed somewhere else in the tank body 26. It is contemplated that the baffles 210 could be disposed differently in the tank body 26. For example the baffles 210 could be disposed vertically and not crossing each other. It is also contemplated that the baffles 210 could cross each other at locations other than their mid-length. It is contemplated that the baffles 210 could not be disposed on a vertical cross-sectional plane. It also contemplated that the two baffles 210 could be different from each other.

The baffles 210 are elongated boards that are retained at each end relative to the liner 96 by the retaining systems 300A. It is contemplated that the baffles 210 could be retained at one end only or could be retained additionally at their sides by one or more retaining systems 300A or by another retaining mean. It is also contemplated that the baffles 210 could have a shape different from an elongated board.

Each baffle 210 is composed of two sub-baffles 212, each of equal width 214 (shown in FIG. 12) smaller than a width of the baffle 210. The narrower sub-baffles 212 can be inserted in the man-way. In an exemplary embodiment shown in the Figures, the man-way has a diameter of 16 inches (40.64 cm), an interior of the tank body 26 has a diameter 27 of about 82 inches (208.2 cm), the sub-baffles 212 have the width 214 of about 14.5 inches (36.83 cm), a thickness of about 0.27 inch (0.68 cm), and a length 216 of 70 inches (177.8 cm) (shown in FIG. 12). Once assembled, the baffle 210 is of 29 inches (73.6 cm) in width and 70 inches in length (177.8 cm). Each baffle 210 is disposed at an angle 203 of 45 degrees with respect to a vertical 211. It is also contemplated that the sub-baffles 212 could not be all identical to each other. It is contemplated that only one or more than two sub-baffles 212 could be part of each baffle 210. It is contemplated that the dimensions of the sub-baffles 212 could be different. It is contemplated that the baffles 210 could be disposed at an angle 203 other than 45 degrees from the vertical 211. It is also contemplated that the baffles 210 could not be disposed at a same angle 203 with respect to the vertical 211.

The sub-baffles 212 have a flange 218 (shown in FIG. 11) on each side 213 (shown in FIG. 12) along their length 216 to form a generally squared U-shaped channel. In the exemplary embodiment shown in the Figures, the flanges 218 are each 3 inches (7.62 cm) high. The flanges 218 provide structural resistance to the sub-baffles 212. It is contemplated that the flanges 218 could have a different height. It is also contemplated that the flanges 218 could be omitted or could be disposed only on a portion of the sides 213 of the sub-baffles 212. The sub-baffles 212 are made of the same composite material as the outer shell 98 of the tank body 26. It is contemplated that the sub-baffles 212 could be made of a different composite material. It is also contemplated that the sub-baffles 212 could be made of a material different from a composite. For example, the sub-baffles 212 could be made of metal, such as aluminum.

Figure 11:
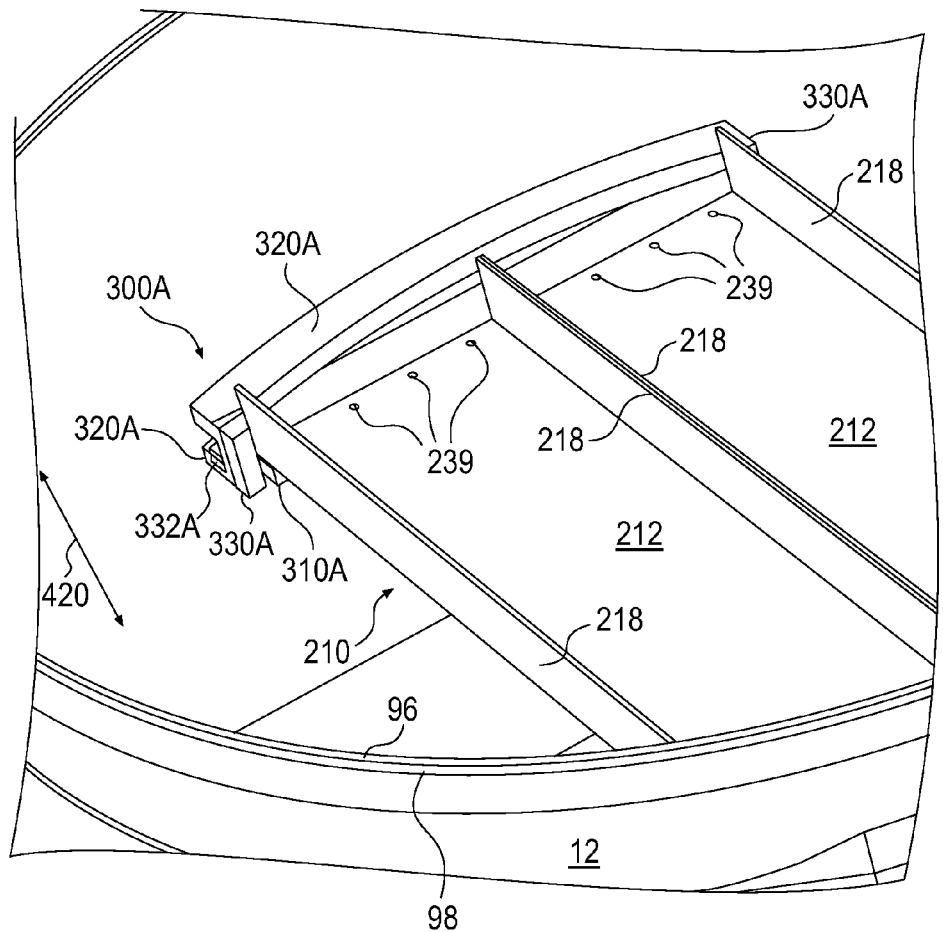
FIG. 11 is a perspective close-up view of the baffle assembly and tank of FIG. 10.
Figure 12:
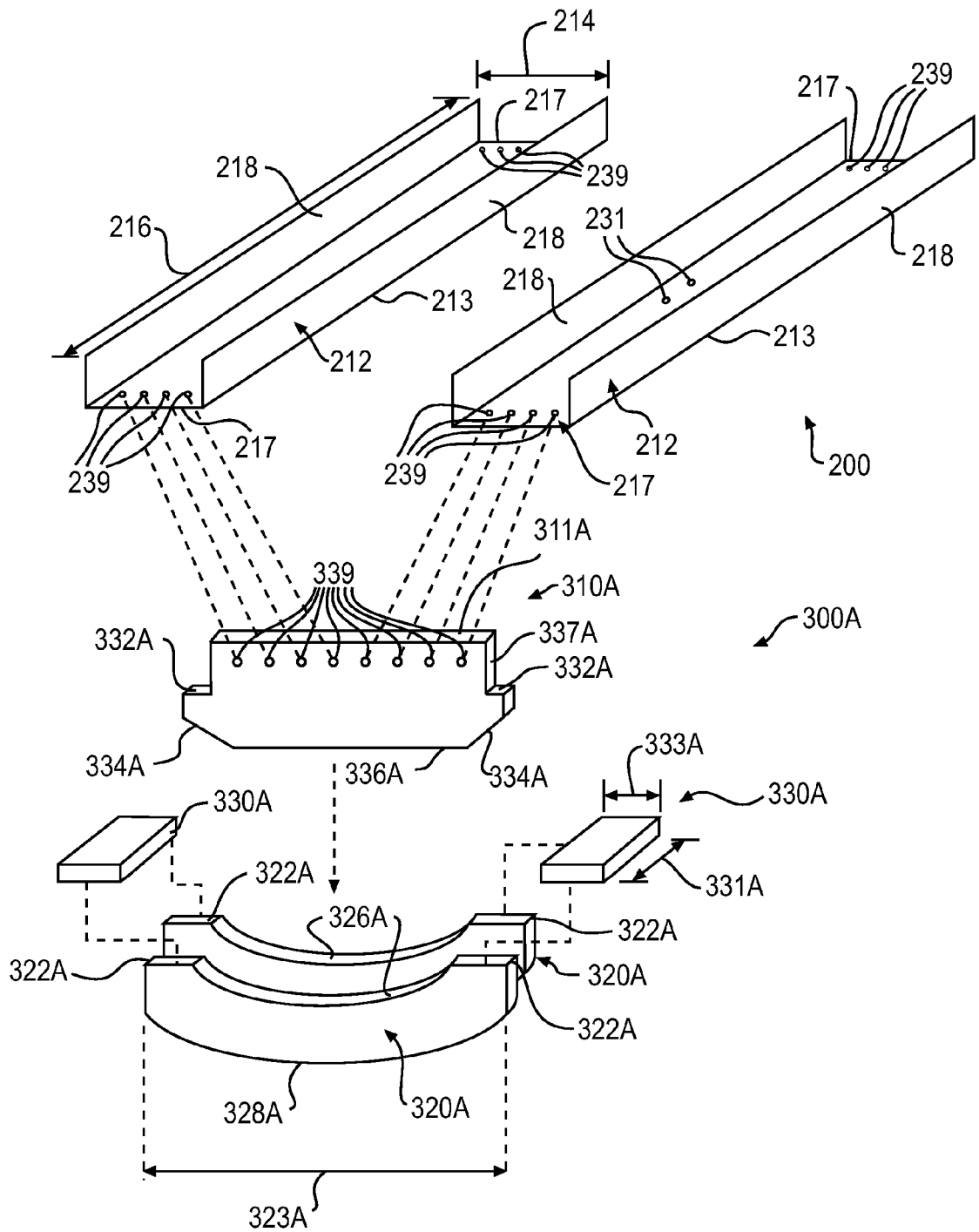
FIG. 12 is an exploded view of a baffle and a retaining system of the baffle assembly of FIG. 10.

The sub-baffles 212 have four apertures 239 at each end 217 (shown in FIG. 12). The apertures 239 are used as removable bolted connections to the retaining system 300A, as will be described below. In the exemplary embodiments shown in FIGS. 10 to 16, the apertures 239 are spaced by 3.5 inches (8.89 cm) from each other. It is contemplated that the sub-baffles 212 could have more or less than four apertures 239, and that they could have a different spacing. It is also contemplated that the apertures 239 could be slots. The sub-baffles 212 also each have two apertures 231 at about their mid-length laterally positioned toward a center of the baffle 210. The apertures 231 are used for bolting the sub-baffles 212 to each other to form the baffle assembly 200. It is contemplated that more or less than two apertures 231 could be used and that the apertures 231 could be positioned somewhere else on the sub-baffles 212. It is contemplated that systems other than bolting could be used to secure the sub-baffles 212 to each other and to the retaining systems 300A. It is contemplated that the apertures 231 could be slots.

Figure 13:
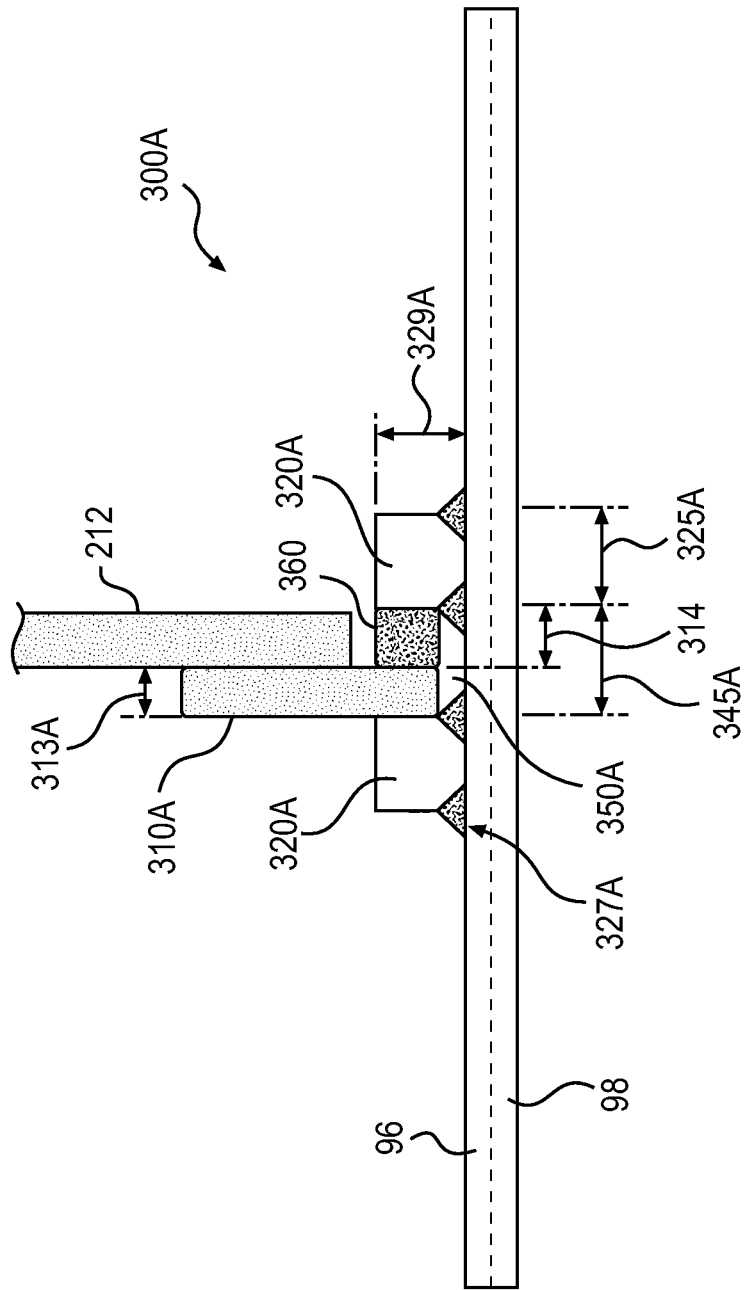
FIG. 13 is a schematic, partial side view of the connection to the tank of the baffle assembly of FIG. 10.

Turning now to FIGS. 11 to 13, a first embodiment of the retaining systems 300A for the baffle assembly 200 will be described. The four retaining systems 300A being identical, only one retaining system 300A will be described. It is contemplated that more or less than four retaining systems 300A could be used to connect the baffle assembly 200 to the tank body 26. Although the retaining system 300A is described for use with the baffle 210 in the tank 12, it is contemplated that the retaining system 300A could be used for elements other than a baffle 210.

The retaining system 300A comprises a baffle connector 310A for removably connecting to the sub-baffles 210, two elongated members 320A receiving the baffle connector 310A and being fixedly connected to the tank body 26, and two tabs 330A for preventing motion of the baffle connector 310A with respect to the elongated members 320A. The baffle connector 310A, the two elongated members 320A and the two tabs 330A are dimensioned to be insertable through the man-way and the retaining system 300A is adapted to be assembled inside the tank 12.

The baffle connector 310A is made of aluminum. It is contemplated that the baffle connector 310A could be made of a material other than aluminum. For example, the baffle connector 310A could be made of the same material as the elongated members 320A. As best seen in FIG. 12, the baffle connector 310A has a horizontal top 311A, a horizontal bottom 336A, two curved portions 334A on the ends of the horizontal bottom 336, and two flanges 332A extending from sides 337A of the baffle connector 310A. The flanges 332A will be described below. It is contemplated that the baffle connector 310A could not have the curved portions 334A. The two curved portions 334A have a curvature corresponding to a curvature of the tank body 26. The flat bottom 336A is spaced (see clearance 350A in FIG. 13) from the liner 96 when the baffle connector 310A is disposed between the elongated members 320A. It is contemplated that the bottom 336A could not be flat. It is also contemplated that the bottom 336A could have a curvature corresponding to that part of the tank body 26. It is also contemplated that the clearance 350A could be omitted, and that the clearance 350A could be filled. In the exemplary embodiment shown in FIGS. 10 to 13, a distance from the top 311A to the bottom 336A is about 6 inches (15.24 cm), a thickness 313A (shown in FIG. 13) of the baffle connector 310A is 1 inch (2.54 cm), and the top 311A of the baffle connector 310A has a length of 29.25 inches (74.3 cm). It is contemplated that the baffle connector 310A could have dimensions different from recited above.

The baffle connector 310A has height apertures 339 for removably connecting to the four apertures 239 of two of the sub-baffles 212 via bolts (not shown). The apertures 339 are spaced so as to be aligned with the four apertures 239 of the sub-baffles. In the exemplary embodiment shown in FIGS. 10 to 13, the height apertures 339 are disposed at 3.5 inches (8.89 cm) from each other, except for the two centrally disposed ones which are at 4 inches (10.16 cm) from each other. The apertures 339 are disposed at 1.25 inches (3.17 cm) from the top 311 of the baffle connector 310A. The sub-baffles 212 are not bolted to each other but form a connection through the baffle connector 310A. When connected to the baffle connector 310A, the sub-baffles 212 have two of the sides 213 adjacent to each other with flanges 218 abutting each other. It is contemplated that the sub-baffles 212 could be connected directly to each other. It is contemplated that the apertures 339 could be slots. It is contemplated that the apertures 339 could be disposed at other locations on the baffle connector 310A. It is also contemplated that the number of apertures 339 could be different. It is contemplated that the sub-baffles 212 could be bolted to each other or secured to each other additionally to being bolted to the baffle connector 310A. It is also contemplated that the sub-baffles 212 could not be abutting each other at the flanges 218, but could have a space between them. It is contemplated that more than one baffle connector 310A could be used. It is contemplated that the sub-baffles 212 could be connected permanently to the baffle connector 310A and that the retaining system 300A could have a removable portion to remove both the baffles 210 and the baffle connector 310A. It is also contemplated that the baffle connector 310A could be omitted.

The flanges 332A of the baffle connector 310A are used for restricting motion of the baffle connector 310A within the elongated members 320A through abutment against the tabs 330A, as will be described below. In an exemplary embodiment shown in FIG. 12, the flanges 332A extend about 1.4 inches (3.55 cm) from each side 337A of the baffle connector 310A. The flanges 332A are at 3 inches (7.62 cm) vertically below the top 311A. It is contemplated that more than one flange 332A could be located on each side of the baffle connector 310A. It is contemplated that the flanges 332A could have other dimensions.

The elongated members 320A will now be described. The elongated members 320A are two elongated beams disposed adjacent to each other. Although the elongated members 320A are two separate beams, it is contemplated that the elongated members 320A could be connected to each other. For example, the elongated members 320A could be the vertically extending flanges of a U-shaped channel. It is also contemplated that the elongated members 320A could each be composed of several beams of lesser length or tabs disposed next to each other along their length so as to generally form a beam.

The elongated members 320A have a height 329A (shown in FIG. 13), and a thickness 325A (shown in FIG. 13). The height 329A is selected so as to allow the clearance 350A between the bottom 336A of the baffle connector 310A and the liner 96. In the exemplary embodiment shown in the Figures, the height 329A is about 5.5 inches (13.97 cm) and the thickness 325A is about 1 inch (2.54 cm). It is contemplated that the height 329A and the thickness 325A could be different from the height and thickness recited above.

The elongated members 320A have a length 323A (shown in FIG. 12) greater than the length of the baffle connector 310A. In the exemplary embodiment shown in the Figures, the length 323A is of 32 inches (81.3 cm). It is contemplated that the elongated members 320A could be shorter than or have the same length as the baffle connector 310A. It is contemplated that the elongated members 320A could be longer than illustrated in FIG. 12 such that the same elongated members 320A could be used to retain two different baffle connectors 310A. For example, the elongated members 320A could span a majority of the circumference of the liner 96 such that the baffle connectors 310A disposed at each end of the baffle 210 could be received between the same two elongated members 320A.

The elongated members 320A have a curved top 326A and a curved bottom 328A. The curvature of the curved bottom 328A corresponds to a curvature of the liner 96 at a location where the elongated members 320A are connected to the liner 96. In the exemplary embodiment shown in FIG. 12, a radius of curvature of the top 326A is about 38 inches (95.62 cm), and a radius of curvature of the d bottom 328 is about 41 inches (104.14 cm). It is contemplated that the top 326A and bottom 328 could have different radii of curvature. It is contemplated that the top 326A could be flat.

The elongated members 320A have flat surfaces 322A extending from each end of the top 326A. The flat surfaces 322A receive the tabs 330A thereon. In the exemplary embodiment shown in the Figures, the flat surfaces 322A have a length of about 2.5 inches (6.35 cm). It is contemplated that the flat surfaces 322A could have a different length.

The curved bottom 328A of the elongated members 320A is welded by welds 327A (schematically shown in FIG. 13) to the liner 96. The clearance 350 allows for the welds 327A not to interfere with the baffle connector 310A. The elongated members 320A are made of the same material as the liner 96 (HDPE), and welding is achieved by heating beads of HDPE at an interface between the liner 96 and the elongated members 320A. The materials used for the elongated members 320A, the baffle assembly 200 and the welds 327A are compatible with the liner 96 and with one another in terms of thermal expansion and contraction so that the retaining system 300A is not overly stressed because of thermal expansion and contraction. It is contemplated that the elongated members 320A could be made of a material different from that of the liner 96. It is also contemplated that connection of the elongated members 320A to the liner 96 could be done differently. It is contemplated that the elongated members 320A could be bonded to the liner 96 by an adhesive.

Turning to FIG. 13, the elongated members 320A are spaced from each other so as to allow the baffle connector 310A and a shim 360 to be inserted therein. The shim 360 is used for ease of manufacturing and tolerances purposes. The shim 360 will be described below. In the exemplary embodiment shown in FIG. 13, a distance 345A between the two elongated members 320A is about 1.5 inches (3.81 cm), and a thickness 314 of the shim 360 is 0.5 inch (1.27 cm). As mentioned above, the thickness 313A of the baffle connector 310A is 1 inch (2.54 cm). It is contemplated that the distance 345A between the elongated members 320A and the thicknesses 314 of the shim 360 and the baffle connector 310A could be different. It is contemplated that more than one shim 360 could be used. It is contemplated that the shim 360 could be omitted, should the thickness of the baffle connector 310A correspond to the distance 345A between the elongated members 320A.

The shim 360 is made of HDPE. It is contemplated that the shim 360 could be made of a different material. The shim 360 runs along the length 323A of the elongated members 320A. It is contemplated that the shim 360 could be shorter than the elongated members 320A.

Referring back to FIG. 12, the tabs 330A will now be described. The tabs 330A are generally rectangular and flat and are dimensioned to connect to each of the two adjacent elongated members 320A. The tabs 330A are made of the same material as the elongated members 320A, and are welded to the elongated members 320A. It is contemplated that the tabs 330A could be connected to the elongated members 320A by other means. For example, the tabs 330A could be connected to the elongated members 320A by an adhesive. It is also contemplated that the tabs 330A could be removably connected to the elongated members 320A. For example, the tabs 330A could be bolted to the elongated members 320A. In the exemplary embodiment shown in FIGS. 10 to 13, the tabs 330A have a width 331A (shown in FIG. 12) of 3.5 inches (8.89 cm), a thickness of about 0.75 inch (1.9 cm), and a length 333A (shown in FIG. 12) of 1.38 inches (3.5 cm). The width 331A of the tabs 330A corresponds to a distance between two external sides of the elongated members 320A. The length 333A of the tabs 330A is smaller than the length of the flat surfaces 322A. It is contemplated that the tabs 330A could be smaller or longer than the flat surfaces 322A. It is also contemplated that the tabs 330A could have dimensions different from those recited above.

As mentioned above, it is contemplated that the baffle connector 310A could be omitted from the retaining system 300A, and that the baffle 210 could be directly and removably retained by the elongated members 320A. The tabs 330A could be removably connected to the elongated members 320A so that, once the tabs 330A removed, the sub-baffles 212 could be detached from the elongated members 320A. The sub-baffles 212 could have an end free of the flange 218 so as to be snugly insertable in between the elongated members 320A. The end without flange 218 could feature a side flange similar to the flange 332A for providing abutment with the tabs 330A. The two sub-baffles 212 could or could not be secure to each other. Other designs are contemplated.

Referring to FIG. 12, assembly of the retaining system 300A will be described. The sub-baffles 212, the baffle connector 310A, the tabs 330A, the elongated members 320A, the bolts, the shim 360, and necessary tools are introduced through the man-way before proceeding to the assembly. It is contemplated that the above elements could be introduced as they are needed during the assembly.

First, two elongated members 320A are disposed adjacent to each other at the distance 345A from each other and in a location in the tank body 26 so as to be located about the vertical cross-sectional plane 11 of the tank body 26. Once positioned, the elongated members 320A are welded to the liner 96. The welds 327A are achieved by heating the beads of HDPE. The two elongated members 320A are spaced from each other so as to allow snug insertion of the baffle connector 310A and shim 360.

Second, the baffle connector 310A and the shim 360 are inserted in between the two adjacent elongated members 320A. The baffle connector 310A is positioned so that the side flanges 332A are generally levelled with the flat surfaces 322A of the two adjacent elongated members 320A. The shim 360 is positioned to be generally levelled with the flat surfaces 322A of the two adjacent elongated members 320A. It is contemplated that the baffle connector 310A and the shim 360 could not be levelled with the elongated members 320A, as long as the shim 360 and the side flanges 332A are disposed within the elongated members 320A. The baffle connector 310A is held by friction-fit between the elongated members 320A. The elongated members 320A restrain motion in a longitudinal direction (illustrated by arrows 420 in FIG. 11). It is contemplated that one or both of the adjacent elongated members 320A could be welded to the liner 96 after positioning the baffle connector 310A and shim 360.

Third, once the baffle connector 310A and the shim 360 are positioned within the elongated members 320A, the tabs 330A are welded to the flat surfaces 322A. The tabs 330A prevent the baffle connector 310A to move in circumferential and radial directions (illustrated by arrows 400 and 410 respectively in FIG. 10). Once the tabs 330A are welded to the elongated members 320A, the baffle connector 310A is securely retained to the liner 96.

The above operation is repeated for the three other retaining systems 300A. Each retaining systems 300A is positioned so that the baffles 210 can be disposed in the X shape (shown in FIG. 10) on the vertical cross-sectional plane 11. To achieve this, two of the retaining systems 300A may be offset from the vertical plane 11 by a distance corresponding to the thickness of the baffles 210 in order to allow the baffles 210 to cross-each other. It is contemplated that one could start with assembling only two of the retaining systems 300A so as to secure one baffle 210 across the tank body 26, before proceeding with two other retaining systems 300A so as to secure the other baffle 210 across the tank body 26.

To assemble one of the baffles 210, two sub-baffles 212 are disposed next to each other and bolted at their ends 217 to two opposite baffle connectors 310A. The two sub-baffles 212 are disposed so that the flanges 218 extend toward a same direction, but each baffle 210 is disposed so that the flanges 218 are facing away from each other. Once in position, the apertures 231 of the four sub-baffles 212 are aligned with each other, and the sub-baffles 212 are bolted to each other via the apertures 231.

When desired, the operator can unbolt the sub-baffles 212 from each other and from the baffle connector 310A, leaving the retaining systems 300A connected to the tank body 26.

Figure 14:
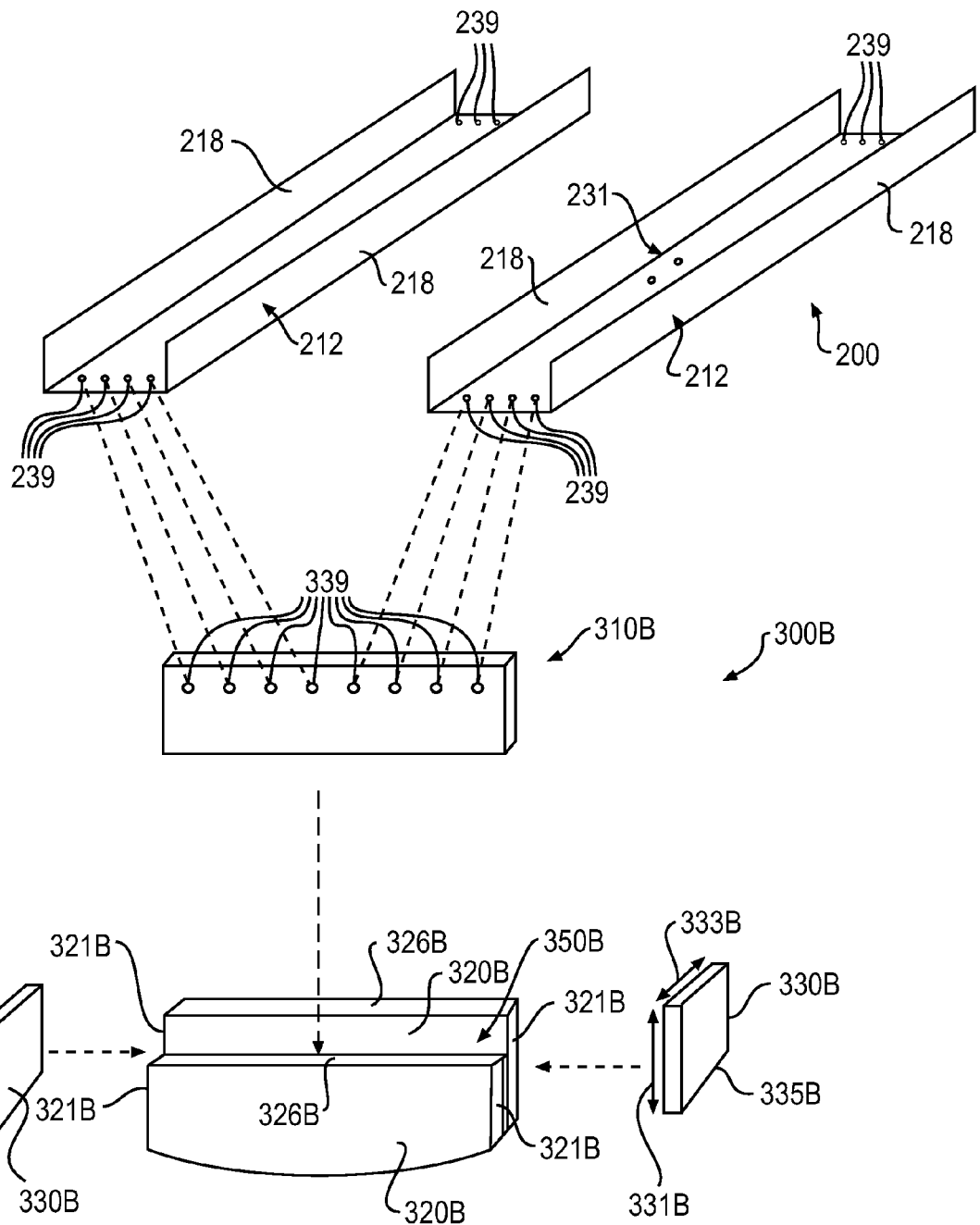
FIG. 14 is an exploded view of a baffle and a retaining system of a baffle assembly according to a second embodiment.

Turning now to FIG. 14, a second embodiment of a retaining system 300B for the baffle assembly 200 will be described.

The retaining system 300B comprises a baffle connector 310B, two elongated members 320B, two caps 330B, and the shim 360. The baffle connector 310B, the two elongated members 320B and the two caps 330B are dimensioned to be insertable through the man-way and the retaining system 300B is adapted to be assembled inside the tank 12, as will be described below. It is contemplated that the shim 360 could be omitted.

The baffle connector 310B is similar to the baffle connector 310A except that it does not have the side flanges 332A and the curved portions 334A. It is contemplated that the baffle connector 310B could have side flanges and/or curved portions. Common elements between the baffle connectors 310B and 310A will not be described again.

The elongated members 320B are similar to the elongated members 320A except that their tops 326B is flat. It is contemplated that the elongated members 320B could have their tops 326B curved. Common elements between the elongated members 320A and 320B will not be described again.

The caps 330B are similar to the tabs 330A except that they are dimensioned to cover ends 321B of the elongated members 320B instead of tops of the elongated members 320B. The caps 330B are dimensioned to have a height 331B corresponding to about a height of the elongated members 320B and width 333B corresponding to a distance between two external sides of the elongated members 320B. The caps 330B have a flat bottom 335B. The caps 330B prevent the baffle connector 310B to move in the circumferential direction, and the friction-fit provided by the elongated members 320B restrain the baffle connector 310B from moving in the radial direction. It is contemplated that the baffle connector 310B could have, in addition, flanges to abut against tabs similar to the tabs 330A, to further prevent motion of the baffle connector 310B in the radial direction. It is also contemplated that the caps 330B could have other dimensions. It is contemplated that the bottom 335B could be curved.

It is contemplated that the baffle connector 310B could be omitted from the retaining system 300B and that the baffle 210 could be directly and removably retained by the elongated members 320B. The caps 330B could be removably connected to the elongated members 320B so that, once the caps 330B removed, the sub-baffles 212 could be rotated so as to be removed from the elongated members 320B. The sub-baffles 212 could have an end free of flange 218 so as to be snugly insertable in between the elongated members 320B. The ends without flange 218 could feature a side flange similar to the flange 332A for providing abutment with the caps 330B. The two sub-baffles 212 could or could not be secured to each other. Other designs are contemplated.

The retaining system 300B is assembled in a way similar to the retaining system 300A and will not be described in details herein again. The elongated members 320B are welded to the liner 96, the baffle connector 310B and the shim 360 are inserted in between the elongated members 320B, the caps 330B are welded to the ends 321B of the elongated members 320B and the sub-baffles 212 are bolted to the baffle connector 310B.

Figure 15:
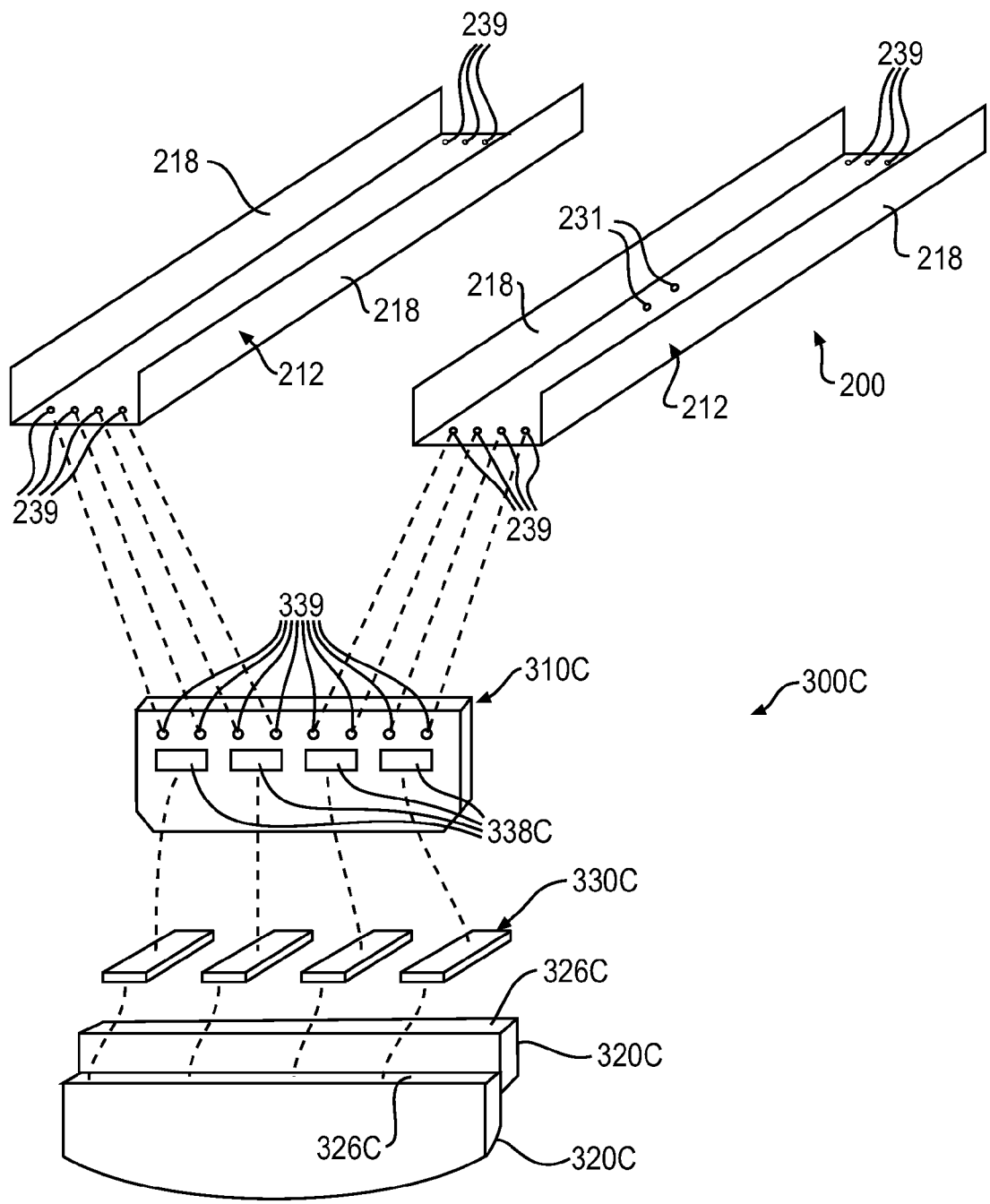
FIG. 15 is an exploded view of a baffle and a retaining system of a baffle assembly according to a third embodiment.

Turning now to FIG. 15, a third embodiment of a retaining system 300C for the baffle assembly 200 will be described.

The retaining system 300C comprises a baffle connector 310C, two elongated members 320C, four tabs 330C, and the shim 360. The elongated members 320C are similar to the elongated members 320B and will not be described herein again. The baffle connector 310C, the two elongated members 320C and the tabs 330C are dimensioned to be insertable through the man-way and the retaining system 300C is adapted to be assembled inside the tank body 26, as will be described below. It is contemplated that the shim 360 could be omitted.

The baffle connector 310C is similar to the baffle connector 310A except that it has four rectangular apertures 338C defined therein and has no side flanges. Elements common to the baffle connectors 310A and 310C will not be described again. It is contemplated that more or less than four apertures 338C could be provided, and that the apertures 338C could not be rectangular. The apertures 338C are disposed vertically below the apertures 339 so that once in place, the apertures 339 are accessible for bolting the baffle connector 310C to the sub-baffles 212.

The tabs 330C are used to retain the baffle connector 310C between the elongated members 320C. The tabs 330C are adapted to be inserted into the apertures 338C and welded to a top 326C of the elongated members 320C. It is contemplated that the tabs 330C could be removably connected to the elongated members 320C. The tabs 330C prevent motion of the baffle connector 310C in both the radial and the circumferential directions.

It is contemplated that the baffle connector 310C could be omitted from the retaining system 300C and that the baffle 210 could be directly and removably connected to the elongated members 320C by providing the apertures 239 in the sub-baffles 212. The tabs 330C could be removably connected to the elongated members 320C so that, once the tabs 330C removed, the sub-baffles 212 could be detached from the elongated members 320C. The sub-baffles 212 could have an end free of flange 218 so as to be snugly insertable in between the elongated members 320C. The two sub-baffles 212 could or could not be secured to each other. Other designs are contemplated.

The retaining system 300C is assembled in a way similar to the retaining system 300A, and will not be described in details herein again. The elongated members 320C are welded to the liner 96, the baffle connector 310C and the shim 360 are inserted in between the elongated members 320C with apertures 239 extending right above the top of the elongated members 320C. The tabs 330C are inserted into the apertures 239 and have their ends welded to the tops 326C of the elongated members 320C.

Figure 16:
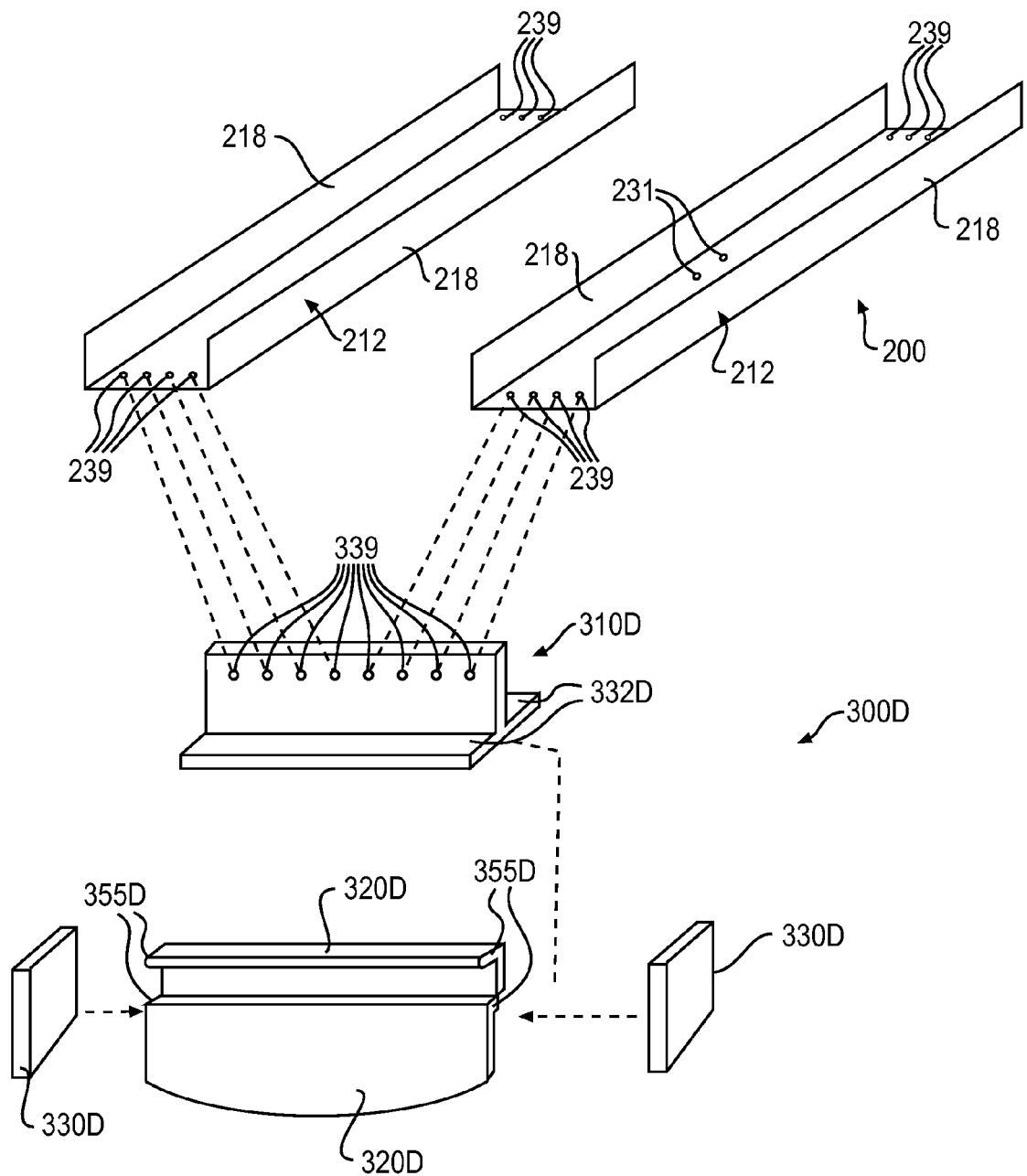
FIG. 16 is an exploded view of a baffle and a retaining system of a baffle assembly according to a fourth embodiment.

Turning now to FIG. 16, a fourth embodiment of a retaining system 300D for the baffle assembly 200 will be described.

The retaining system 300D comprises a baffle connector 310D, two elongated members 320D, two caps 330D, and the shim 360. The caps 330D are similar to the caps 330B and will not be described herein again. The baffle connector 310D, the two elongated members 320D and the two caps 330D are dimensioned to be insertable through the man-way and the retaining system 300D is adapted to be assembled inside the tank body 26, as will be described below. It is contemplated that the shim 360 could be omitted.

The baffle connector 310D is similar to the baffle connector 310B except that it has two flanges 332D extending outwardly. The flanges 332D are dimensioned to abut against flanges 355D of the elongated members 320D.

The elongated members 320D are similar to the elongated members 320B except that they each have one flange 355D located at a top of the elongated members 320D. The elongated members 320D are to be disposed facing each other so that the flanges 335D create a rail therebetween. The flanges 335D prevent the baffle connector 310D from moving in the radial and longitudinal directions. The caps 330D prevent the baffle connector 310D to move in the circumferential direction by sliding out of the rail. It is contemplated that each flange 335D could comprise two flanges vertically aligned so as to brace one of the flange 332D of the baffle connector 310D.

It is contemplated that the baffle connector 310D could be omitted from the retaining system 300D and that the baffles 210 could be directly and removably retained by the elongated members 320D. The caps 330D could be removably connected to the elongated members 320D. To allow a secure connection between the sub-baffles 212 and the elongated members 320D, the sub-baffles 212 could be modified to have an end free of flange 218. The baffle connector 310D could be omitted and the sub-baffles 212 could have flanges similar to flanges 332A to be retained by the elongated members 320D so that, once the caps 330D removed, the sub-baffles 212 could be slid in and out the elongated members 320D. The two sub-baffles 212 could or could not be secured to each other. Other designs are contemplated.

The retaining system 300D is assembled in a way similar to the retaining system 300A, and will not be described again in details herein again. The elongated members 320D are welded to the liner 96 with flanges 335D facing each other and spaced so as to allow the baffle connector 310D to be received therebetween. The baffle connector 310D and the shim 360 are inserted in between the elongated members 320D. The baffle connector 310D is inserted from a side of the elongated members 320A (as illustrated in FIG. 16) so as to insert the flanges 332D vertically below the flanges 335D. The shim 360 is disposed between a side of the flanges 332D and the elongated members 320D. It is contemplated that the shim 360 could be disposed somewhere else. For example, the shim 360 could be disposed between the flanges 332D and 355D. The caps 330D are welded or fastened to the sides of the elongated members 320D, once the baffle connector 310D is disposed inside the elongated members 320D.

Figure 17:
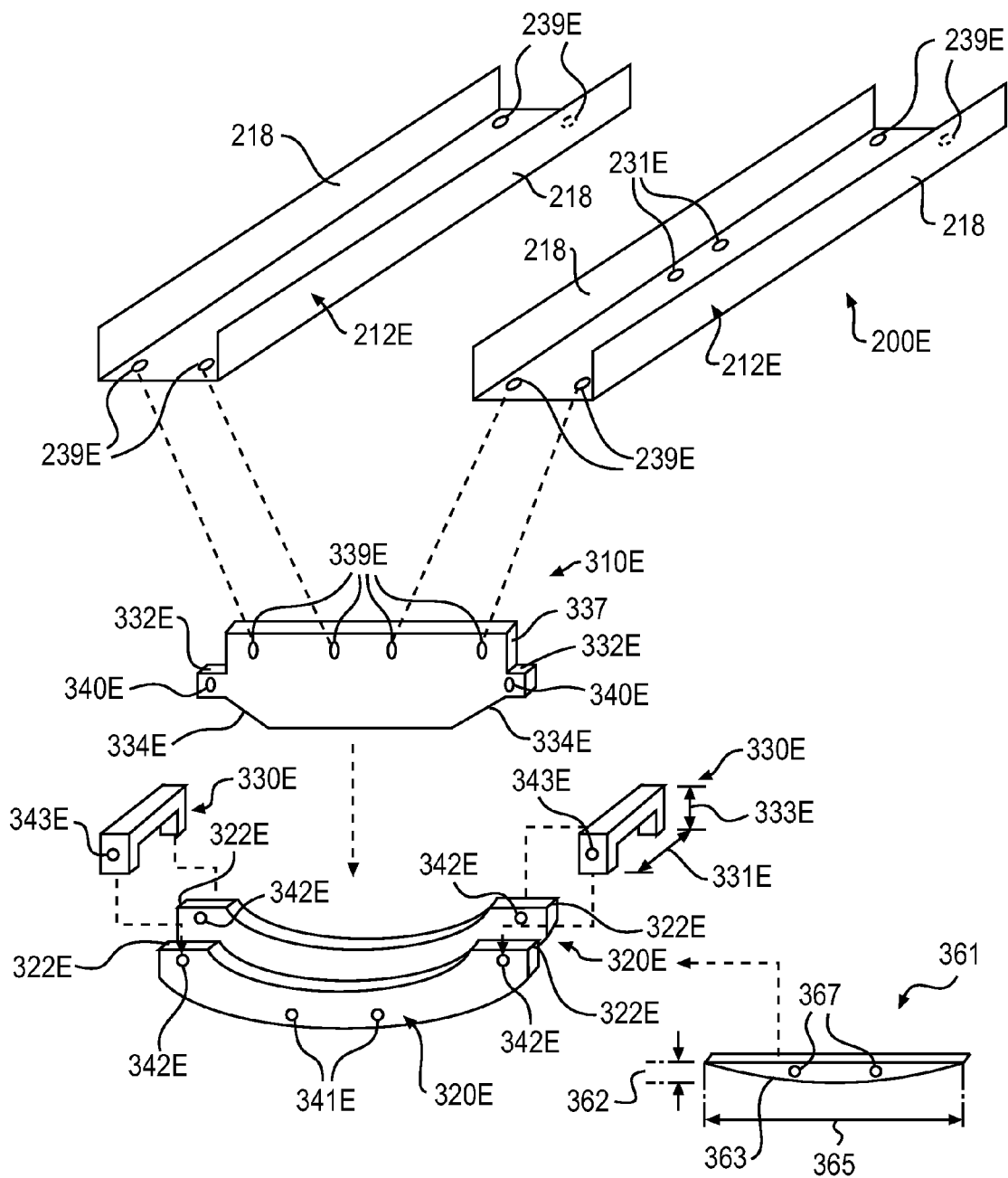
FIG. 17 is an exploded view of a baffle and a retaining system of a baffle assembly according to a fifth embodiment.
Figure 18:
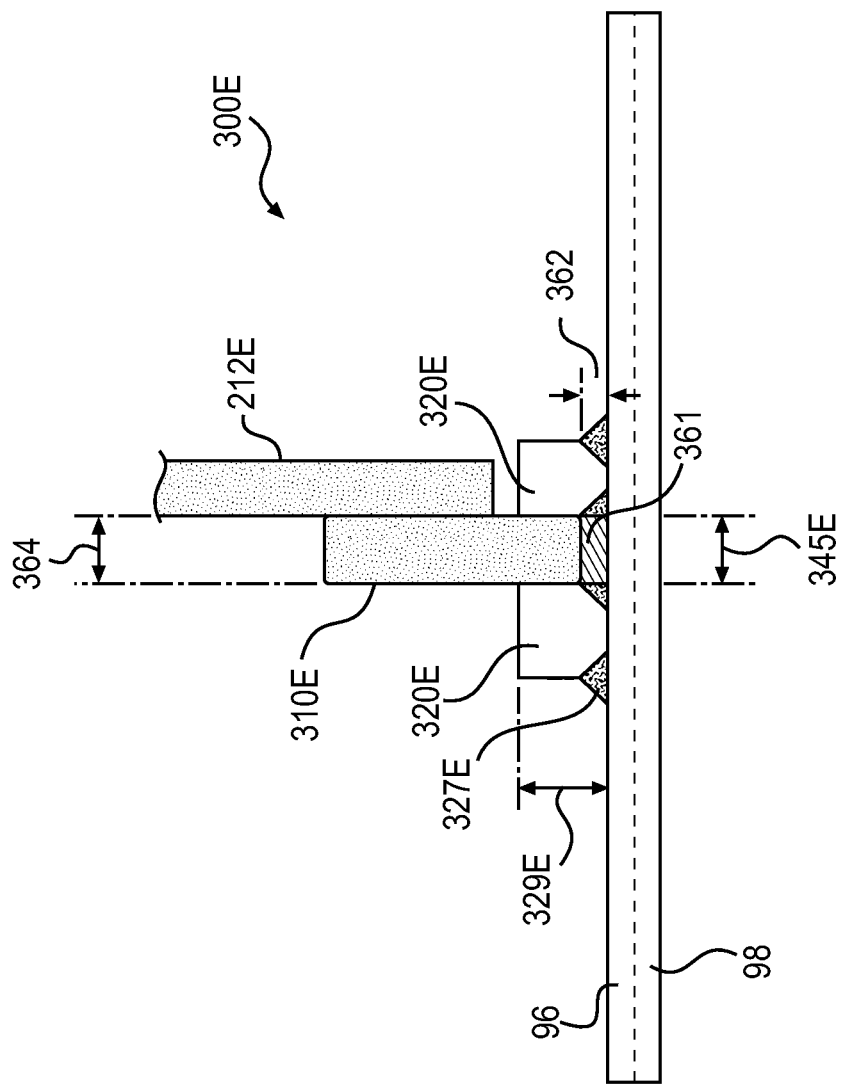
FIG. 18 is a schematic, partial side view of a connection to the tank of the baffle assembly of FIG. 17.

Turning now to FIGS. 17 and 18, a fifth embodiment of a retaining system 300E for a second embodiment of the baffle assembly 200E will be described. The retaining system 300E is described for retaining a pair of sub-baffles 212E. The sub-baffles 212E are similar to the sub-baffles 212 except that they each have two apertures 239E each instead of four. Each aperture 239E is a slot. The slot is about 1 inch (2.54 cm) long. The apertures 239E of a same sub-baffle 212E are spaced from each other by 9.5 inches (24.13 cm). The sub-baffles 212E also each have two apertures 231E which are similar to the apertures 231 of the sub baffle 212 except that they are slots. It is contemplated that the sub-baffles 212E could have more or less than two apertures 239E each. It is also contemplated that the apertures 239E could be at a distance from each other different from the one recited above.

The retaining system 300E comprises a baffle connector 310E, two elongated members 320E, two caps 330E, and a wear element 361. The baffle connector 310E, the two elongated members 320E and the two caps 330E are dimensioned to be insertable through the man-way and the retaining system 300E is adapted to be assembled inside the tank 12, as will be described below. It is contemplated that the wear element 361 could be omitted.

The baffle connector 310E is similar to the baffle connector 310A, and common elements between the baffle connectors 310E and 310A will not be described again. The baffle connector 310E has four apertures 339E to connect with the four apertures 239E of the sub-baffles 212E, and has two apertures 340E, one on each flange 332E. The apertures 339E, 340E are slots. The baffle connector 310E has a flat portion 334E. It is contemplated that the baffle connector 310E could have more or less than four apertures 339E and/or two apertures 340E. It is also contemplated that the apertures 339E and/or 340E could not be slots. It is contemplated that the apertures 340E could be omitted. It is contemplated that the portion 334E could be curved.

The elongated members 320E are similar to the elongated members 320A except that they each have two apertures 341E and two apertures 342E. Common elements between the elongated members 320A and 320E will not be described again. As will be described below, the wear element 361 is bolted between the elongated members 320E via the apertures 341E and to the baffle connector 310E via apertures 342E. It is also contemplated that the elongated members 320E could have none, more than one or two apertures 341E.

The caps 330E are U-shaped to cover a top and parts of external sides of the elongated members 320E. The caps 330E have each two apertures 343E (only one being shown on each cap 330E) for receiving bolts (not shown) to secure the caps 330E to the elongated members 320E via the apertures 342E. The caps 330E are dimensioned to provide a snug fit with the elongated members 320E. In the exemplary embodiment shown in FIG. 17, a height 333E of the caps 330E is 2.5 inches (6.35 cm) and a length 331E of the caps 330E is of 4 inches (10.16 cm). The caps 330E are each disposed at 0.25 inch (0.63 cm) from a corresponding one of the ends 322E of the elongated members 320E. The caps 330E prevent the baffle connector 310E to move in the radial direction, and the friction-fit provided by the elongated members 320E restrain the baffle connector 310E from moving in the radial and circumferential directions. It is contemplated that the retaining system 300E could further have tabs similar to the caps 330B, to further prevent motion of the baffle connector 310E in the circumferential direction. It is contemplated that the caps 330E could be disposed more or less close to the ends 322E. It is also contemplated that the caps 330E could have more or less than two apertures 343E each. For example, the caps 330E could have no aperture 343E, and could be welded to the elongated members 320E during assembly of the retaining system 300E. It is contemplated that the baffle connector 310E could be omitted from the retaining system 300E and that the sub-baffle 212E could be directly and removably retained by the elongated members 320E. Once the caps 330E removed, the sub-baffles 212E could be rotated so as to be removed from the elongated members 320E. The sub-baffles 212E could have an end free of flange 218 so as to be snugly insertable in between the elongated members 320E. The ends without flanges 218 could each have side flanges similar to the flanges 332A for providing abutment with the caps 330E. The two sub-baffles 212E could or could not be secured to each other. Other designs are contemplated.

The wear element 361 is adapted to be disposed between the elongated members 320E. The wear element 361 has two apertures 367 for receiving bolts (not shown) to secure the wear element 361 to the elongated members 320E. It is contemplated that the wear element 361 could have only one or more than two apertures 367. The wear element 361 is bolted to the elongated members 320E to present the liner 96 from being worn by movements of the wear element 361 during use of the transport tank 12. It is contemplated that the wear element 361 could be secured to the elongated members 320E by ways other than bolting. For example, the wear element 361 could be held by friction fit to the elongated members 320E. The wear element 361 has a curved bottom 363 congruent with the liner 96. The wear element 361 is made of a material similar to the one of the liner 96. It is contemplated that the wear element 361 could be made of a material different from the one of the liner 96. The wear element 361 has a shorter length 365 and a shorter height 362 than the ones of the elongated members 320E, but has a thickness 364 corresponding to a distance 345E between the elongated members 320E. In the exemplary embodiment shown in FIGS. 17 and 18, the length 365 of the wear element 361 is 23 inches (58.42 cm), the thickness 364 (shown in FIG. 18) of the wear element 361 is 1 inch (2.54 cm), and the height 362 of the wear element 361 is 1.63 inches (4.14 cm), smaller than a height 329E (shown in FIG. 18) of the elongated members 320E to allow the baffle connector 310E to be inserted between the elongated members 320E. It is contemplated that the wear element 361 could have dimension different from the ones recited above.

The retaining system 300E is assembled in a way similar to the retaining system 300A and will not be described in details herein again. The elongated members 320E are welded to the liner 96 by welds 327E (shown in FIG. 18). The welds 327E are similar to the welds 327A. The wear element 361 is inserted between the elongated members 320E. The apertures 367 of the wear element 361 are aligned with the apertures 341E of the elongated members 320E. The wear element 361 is welded to the liner 96. It is contemplated that the wear element 361 could not be welded to the liner 96. Bolts are slid into the apertures 341E, 367 and are secured by nuts (not shown) so that the wear element 361 is secured to the elongated members 320E. The baffle connector 310E is inserted between the elongated members 320E to rest onto the wear element 361. The caps 330E are disposed at the ends 322E of the elongated members 320E. For each side of the elongated members 320E, a bolt is inserted through the apertures 343E of the caps 330E, the apertures 342E of the elongated members and the apertures 340E of the baffle connector 310E so as to secure the baffle connector 310E with the elongated members 320E and the caps 330E. The caps 330E are welded to the elongated members 320E. It is contemplated that the caps 330E could not be welded to the elongated members 320E. The sub-baffles 212 are bolted to the baffle connector 310E, in a way similar to what has been described above for the retaining system 300A.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A transport tank for mounting to a truck, the transport tank comprising:
   a tank body having a liner defining an inner surface of the tank body and the tank body being cylindrical in section;
   a baffle having a retained end and the baffle being removably connected by the retained end to the inner surface of the tank body; and
   a retaining system removably connecting the baffle to the inner surface of the tank body, the retaining system comprising:
   a pair of elongated members fixedly connected to the inner surface of the tank body, the pair of elongated members disposed adjacent each other and spaced apart forming an elongate channel between the pair of elongated members, the retained end received in the elongate channel and restrained from movement in a longitudinal direction with respect to the cylindrical section; and
   a retainer connected to the pair of elongated members and blocking an end of the elongate channel, the retainer blocking sideways movement of the retained end out of the elongate channel and thereby restraining movement of the baffle in a circumferential direction with respect to the cylindrical section.

2. The transport tank of claim 1, wherein the pair of elongated members is generally perpendicular to a longitudinal centerline of the tank body.

3. The transport tank of claim 1, wherein when the transport tank is mounted onto the truck, the pair of elongated members is disposed vertically above a lowest point of the inner surface of the tank body.

4. The transport tank of claim 1, wherein the retainer is fixedly connected to the pair of elongated members.

5. The transport tank of claim 1, wherein:
   the retainer includes a pair of tabs,
   the tabs connect the elongated members together, and
   the retained end is disposed at least in part between the tabs.

6. The transport tank of claim 1, wherein the baffle has a second retained end; and
   further comprising a second retaining system removably connecting the second retained end of the baffle to the inner surface of the tank body.

7. The transport tank of claim 1, wherein the retaining system further comprises a baffle connector having a first end and a second end, the first end of the baffle connector is removably connected to the baffle and forms the retained end of the baffle and the second end of the baffle connector is disposed at least in part between the pair of elongated members.

8. The transport tank of claim 7, wherein the second end of the baffle connector has outwardly extending tabs, and the tabs are disposed radially between the retainer and the tank body.

9. The transport tank of claim 7, wherein the retainer abuts the baffle connector for restraining movement of the baffle connector from moving in the circumferential direction.

10. The transport tank of claim 7, wherein the first end of the baffle connector is fastened to the baffle.

11. The transport tank of claim 7, wherein the baffle connector is spaced from the inner surface of the tank body.

12. The transport tank of claim 7, further comprising a wear element disposed between the second end of the baffle connector and the inner surface of the tank body, the second end of the baffle connector abutting the wear element.

13. The transport tank of claim 7, wherein the baffle comprises a first sub-baffle and a second sub-baffle, and the first and second sub-baffles are removably connected to the baffle connector.

14. The transport tank of claim 1, wherein the baffle has outwardly extending flanges, and the flanges are disposed radially between the retainer and the tank body.

15. The transport tank of claim 1, wherein the retainer includes bolts securable in aligned apertures on the elongated members and extending across the elongated channel.

16. The transport tank of claim 15, wherein the bolts are further secured through apertures in the retained end.

17. The transport tank of claim 15, wherein the retaining system further comprises a baffle connector having a first end and a second end, the first end of the baffle connector is removably connected to the baffle and forms the retained end of the baffle and the second end of the baffle connector is disposed at least in part between the pair of elongated members and wherein the bolts are further secured through apertures in the second end.

18. The transport tank of claim 1, wherein the retainer includes a retainer member at each end of the elongated channel.

19. The transport tank of claim 1, wherein the retainer engages the retained end.

20. The transport tank of claim 1, wherein the retainer further resists radial movement of the retained end out of the elongate channel.

21. A transport tank for mounting to a truck, the transport tank comprising:
a tank body having a liner defining an inner surface of the tank body;
a baffle; and
a retaining system removably connecting the baffle to the inner surface of the tank body, the retaining system comprising:
a pair of elongated members fixedly connected to the inner surface of the tank body;
a retainer connected to the pair of elongated members; and
a baffle connector having a first end and a second end, the first end of the baffle connector being removably connected to the baffle, the second end of the baffle connector being disposed at least in part between the pair of elongated members, the pair of elongated members restraining movement of the baffle connector in a first direction, and the retainer restraining movement of the baffle connector in a second direction, the second direction being different from the first direction,
wherein the second end of the baffle connector has outwardly extending tabs, and at least a portion of the tabs are disposed radially between the retainer and the tank body.

22. The transport tank of claim 21, wherein the retainer includes bolts securable in aligned apertures on the pair of elongated members.

23. The transport tank of claim 22, wherein the bolts are further secured through apertures in tabs.

24. The transport tank of claim 21, wherein the retainer includes a retainer member at each end of the pair of elongated members.

25. The transport tank of claim 21, wherein the retainer engages the second end.

26. The transport tank of claim 21, wherein the retainer further resists radial movement of the baffle connector relative to the pair of elongated members.

27. The transport tank of claim 21, wherein the pair of elongated members is generally perpendicular to a longitudinal centerline of the tank body.

28. The transport tank of claim 21, wherein when the transport tank is mounted onto the truck, the pair of elongated members is disposed vertically above a lowest point of the inner surface of the tank body.

29. The transport tank of claim 21, wherein the retainer is fixedly connected to the pair of elongated members.

30. The transport tank of claim 21, wherein the baffle has a first end and a second end, the retaining system is a first retaining system, and the first retaining system removably connects the first retained end of the baffle to the inner surface of the tank body; and
further comprising a second retaining system removably connecting the second end of the baffle to the inner surface of the tank body.

31. The transport tank of claim 21, wherein the retainer abuts the baffle connector for restraining movement of the baffle connector from moving in the second direction.

32. The transport tank of claim 21, wherein the first end of the baffle connector is fastened to the baffle.

33. The transport tank of claim 21, wherein the baffle connector is spaced from the inner surface of the tank body.

34. The transport tank of claim 21, further comprising a wear element disposed between the second end of the baffle connector and the inner surface of the tank body, the second end of the baffle connector abutting the wear element.

35. The transport tank of claim 21, wherein the baffle comprises a first sub-baffle and a second sub-baffle, and the first and second sub-baffles are removably connected to the baffle connector.

36. The transport tank of claim 21, wherein:
the tank body has a cylindrical section,
the first direction is a longitudinal direction with respect to the cylindrical section, and
the second direction is a circumferential direction with respect to the cylindrical section.

* * * * *